United States Patent
Obaidi et al.

(10) Patent No.: US 11,783,082 B2
(45) Date of Patent: Oct. 10, 2023

(54) PRIVACY MANAGER

(71) Applicant: T-Mobile USA, Inc., Bellevue, WA (US)

(72) Inventors: Ahmad Arash Obaidi, Sammamish, WA (US); Eric Yocam, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 289 days.

(21) Appl. No.: 17/075,599

(22) Filed: Oct. 20, 2020

(65) Prior Publication Data
US 2022/0121773 A1    Apr. 21, 2022

(51) Int. Cl.
*G06F 21/62*   (2013.01)
*G06N 20/00*   (2019.01)
*G06F 9/4401*   (2018.01)
*G06F 21/60*   (2013.01)

(52) U.S. Cl.
CPC ........ *G06F 21/6245* (2013.01); *G06F 9/4411* (2013.01); *G06F 21/602* (2013.01); *G06N 20/00* (2019.01)

(58) Field of Classification Search
CPC .... G06F 21/6245; G06F 21/60; G06F 21/606; G06N 20/00
See application file for complete search history.

(56) References Cited

U.S. PATENT DOCUMENTS

| | | | |
|---|---|---|---|
| 9,313,454 B2 | 4/2016 | Lalonde et al. | |
| 9,461,970 B2 | 10/2016 | Biswas et al. | |
| 10,318,759 B2 | 6/2019 | Vaha-Sipila et al. | |
| 2014/0096261 A1 | 4/2014 | Boldyrev et al. | |
| 2019/0147175 A1* | 5/2019 | Varerkar | G06V 10/764 726/26 |
| 2019/0166489 A1 | 5/2019 | James | |
| 2021/0073412 A1* | 3/2021 | Kvochko | G06T 1/0021 |
| 2022/0036708 A1* | 2/2022 | Rey | H04N 7/15 |

* cited by examiner

*Primary Examiner* — Olugbenga O Idowu
(74) *Attorney, Agent, or Firm* — Han Santos, PLLC

(57) ABSTRACT

Methods, systems, and apparatus, including computer programs encoded on a computer storage medium, for implementing a privacy manager are disclosed. In one aspect, a method includes the actions of receiving, from a client device, an indication of a first setting of the client device. The actions further include receiving, from the client device, an indication of a type of data that the client device is prepared to transmit. The actions further include, based on the first setting and the type of data, generating an instruction to adjust the first setting or a second setting of the client device. The actions further include, before the client device transmits the data, providing, for output to the client device, the instruction to adjust the first setting or the second setting of the client device.

18 Claims, 6 Drawing Sheets

//  PRIVACY MANAGER

BACKGROUND

Digital privacy involves the storing, repurposing, and displaying of information pertaining to oneself typically through interaction with an electronic device. Digital privacy can involve either personally identifiable information (PII) or non-PII information such as a user's behavior on a website. An example of PII may be age and physical address, which alone could identify who an individual is without explicitly disclosing their name, as these two factors are unique enough to identify a specific person typically.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Mobile devices include numerous sensors that collect data related to many aspects of the environment. These sensors can include an accelerometer, a gyroscope, a proximity sensor, a heart rate sensor, and a thermometer, in addition to sensors such as a camera, a microphone, and a fingerprint sensor. In some instances, the data collected by each of these sensors is precise enough to uniquely identify an individual and determine certain characteristics of the individual. For example, camera resolution has increased such that a video of a person's face may expose a health condition of that person. While the health condition may not be apparent to a viewer of a high-resolution video, a computing device may be able to analyze the high-resolution video and identify the health condition, thus breaching the person's privacy.

To avoid a privacy breach involving transmission of collected sensor data, a wireless carrier network may implement a number of privacy protections that can alert the user to situations where the user's privacy may be breached or automatically take the necessary actions to prevent a breach. The privacy protections may include monitoring the sensors that are actively collecting data, monitoring the sensor data that is being transmitted over the network, identifying an intended recipient of the sensor data, and determining the activity in which the user is engaged. Based on these, the wireless carrier network may determine to change a setting on the mobile device or suggest that the user change the setting. The determination may be based one or more rules and/or machine learning models.

As an example, a user may be participating in a video call. The camera of the mobile device may be capturing video with a 4K resolution, and the mobile device is transmitting the 4K video to the recipients. Based on the privacy settings, the wireless carrier network may identify the 4K video stream as increasing the likelihood of a privacy breach based on the ability of a computing device to analyze the video and identify potential health conditions. Because the 4K video stream increases the likelihood of a privacy breach and because the user is participating in a video call, the wireless carrier network may automatically reduce the resolution of the video before transmitting the video over the network. By taking this action, even if a nefarious actor intercepted the video data, the nefarious actor may be unable to analyze the video stream to identify any health conditions that may be apparent from a 4K video. The user and the recipients of the video call may still have a successful video call even with the reduced resolution.

Figure 1:
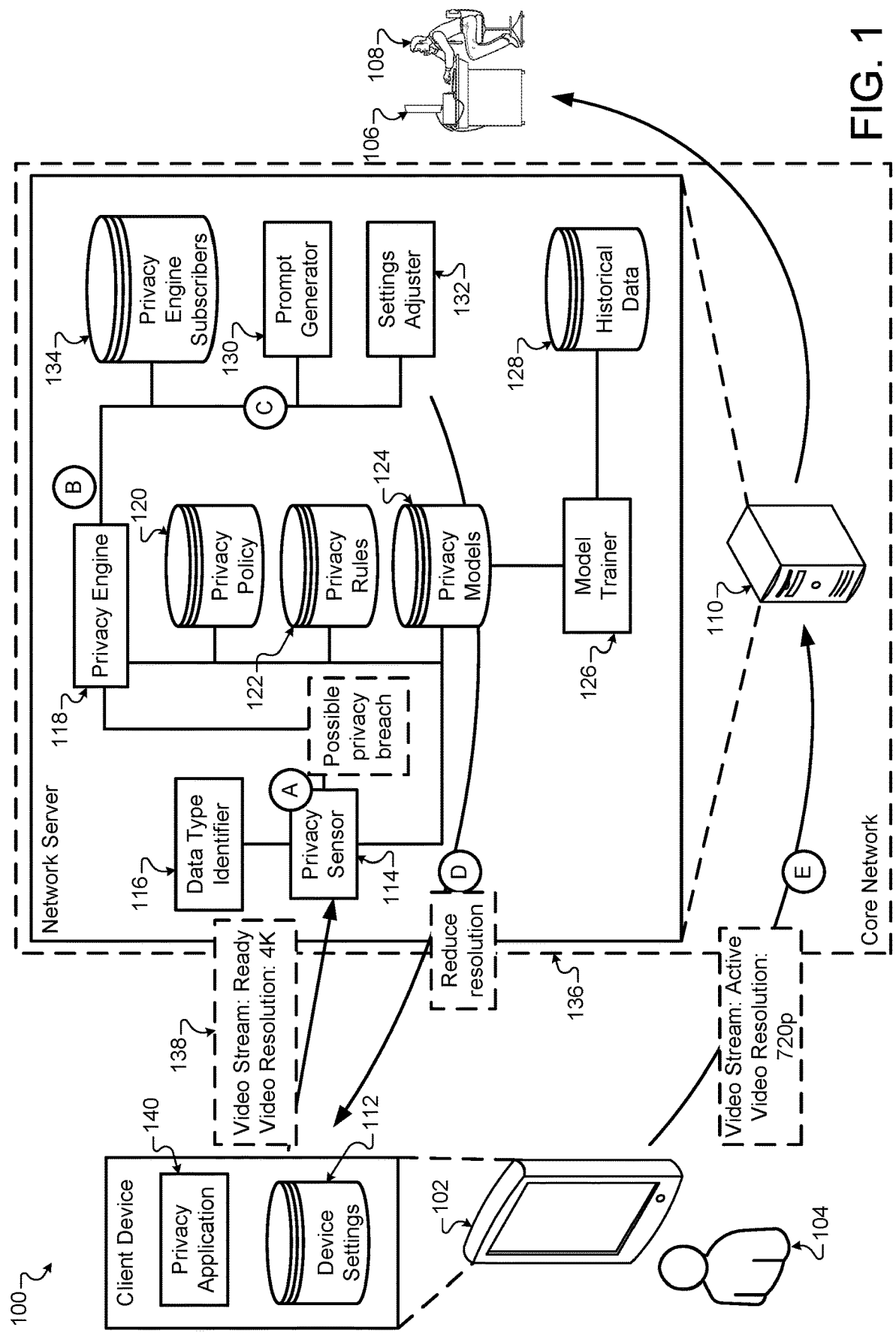
FIG. 1 illustrates an example system for ensuring the privacy of a user by adjusting the resolution of a video stream.

FIG. 1 illustrates an example system 100 for ensuring the privacy of a user 104 by adjusting the resolution of a video stream. Briefly, and as described in more detail below, the user 104 is using the client device 102 to attempt to communicate with the user 108. The client device 102 is connected to a wireless carrier network that includes the network server 110. The network server 110 determines that the privacy of the user 104 may be breached while communicating with the user 108. Based on that determination, the network server 110 instructs the client device 102 to adjust a setting to decrease the likelihood that the privacy of the user 104 may be breached. Additionally, or alternatively, the network server 110 may adjust settings of the network server 110 to decrease the likelihood that the privacy of the user 104 may be breached. In some implementations, the discussion below that relates to data transmitted from the client device 102 to the computing device 106 applies similarly to data transmitted from the computing device 106 to the client device 102, unless indicated otherwise or evident from the description.

In more detail, and in stage A, the user 104 begins the process of setting up a video call with the user 108. This process may include accessing a video call application on the client device 102. The user 104 may select the user 108 from a contacts list and ensure that the video call application is able to access the camera and microphone. The client device 102 may access the device settings 112 to determine a resolution for the video call. The user 104 may set the device settings 112 and indicate that the default resolution for video calls should be 4K. The client device 102 may transmit video call initialization data 138 over the wireless carrier network to the network server 110 indicating that the client device 102 is attempting to initialize a video call with the computing device 106 of the user 108. The video call initialization data 138 may include data indicating the identity of the recipient, user 108, and/or data indicating the resolution of the video call.

The network server 110 may receive the video call initialization data 138. The network server 110 may include a privacy sensor 114 that is configured to determine when a privacy breach may be possible. The privacy sensor 114 may be determine that a privacy breach is possible based on the video call initialization data 138 and data from the data type identifier 116. The data type identifier 116 may be configured to determine the type of data that the client device 102 is prepared to transmit to the computing device 106. The data type identifier 116 may determine that the client device 102 is prepared to stream video data based on the video call initialization data 138. The data type identifier 116 may identify other types of data such as audio data, text data, image data, and/or any other type of similar data. The data type identifier 116 may also determine whether the data is streaming data. For example, the video data in a video call is streaming data, and text data from an email may not be streaming data.

The privacy sensor 114 may use one or more rules of the privacy rules 122 to determine when a privacy breach may be possible. The rules may use the type of data that the client device 102 is prepared to transmit, a setting of the client device 102, the identity of the recipient, and/or any other similar information to determine whether a privacy breach may be possible. The setting of the client device 102 may be related to the data that the client device is prepared to transmit. For example, the setting may be a resolution of video data, a sample rate of audio data, whether artificial intelligence capabilities are active, an encryption setting for audio, video, or text data, or any other similar setting. The rules may generate a privacy breach score that indicates a likelihood of a privacy breach. A higher privacy breach score may indicate a higher likelihood of a privacy breach. The rules may be predetermined based on the relative privacy risk related to the data type, the setting, the recipient, or other factors. For example, a rule may indicate that a video stream that depicts a user at 4K resolution has a privacy breach score of 0.5. That same rule may indicate that a video stream that depicts a user at a 720p resolution has a privacy breach score of 0.1. Another rule may generate a privacy breach score based on the sampling and bit rate of an audio stream that encodes the voice of a user.

The privacy sensor 114 may compare the privacy breach score to a threshold. The privacy rules 122 may store the thresholds. If the privacy breach score satisfies the threshold, then the privacy sensor 114 may determine that a privacy breach may be possible. For example, if the privacy breach score is 0.5 and the threshold is 0.3, then the privacy sensor 114 may determine that a privacy breach may be possible. If the privacy breach score does not satisfy the threshold, then the privacy sensor 114 may determine that a privacy breach may not be possible or that a privacy breach is unlikely enough not to adjust any settings on the client device 102. For example, if the privacy breach score is 0.1 and the threshold is 0.3, then the privacy sensor 114 may determine that a privacy breach may not be possible. In some implementations, the user 104 may be able to set the threshold as a way of indicating the level of risk that the user 104 is comfortable with regarding breaches of privacy.

In some implementations, the privacy sensor 114 may use a model that is configured to receive data indicating the settings of the client device 102, data identifying the type of data that the client device 102 is prepared to transmit, and/or any additional data. The model may be stored in the privacy models 124 and may be configured to output a privacy breach score and/or an indication whether a privacy breach is likely. The model trainer 126 may train the model using machine learning and historical data 128. The historical data 128 may include the settings of a client device, the type of data transmitted by the client device, whether a privacy breach occurred, and/or any other type of data.

In some implementations, the model trainer 126 may be configured to retrain the model based on data received after the client device 102 transmits the data. Based on the model, the video call initialization data 138, and the type of data from the data type identifier 116, the privacy sensor 114 may indicate a privacy breach score of 0.5. The model trainer 126 may receive data indicating that a privacy breach did not occur. If no settings changed on the client device 102, then the model trainer 126 may add the video call initialization data 138, the type of data from the data type identifier 116, and data indicating that a privacy breach did not occur to the historical data. The model trainer 126 may update the model using machine learning and the updated historical data 128.

In the example of FIG. 1, the privacy sensor 114 receives the video call initialization data 138 indicating that the client device 102 is prepared to stream video data at a 4K resolution. The data type identifier 116 determines that type of data that the client device 102 is prepared to transmit is video data. Based on those inputs, the privacy sensor 114 uses rules and/or models and determines that a privacy breach is possible and/or likely. The privacy sensor 114 provides data indicating that a privacy breach is possible and/or likely to the privacy engine 118.

In stage B, the privacy engine 118 receives the data indicating that a privacy breach is possible and/or likely. The privacy engine 118 may be configured to identify actions that may mitigate the possibility of a privacy breach. The actions may include encrypting a data stream, adjusting the artificial intelligence capabilities of the client device 102, adjusting the resolution of video data, adjusting the sample rate and/or bitrate of audio data, alerting the user, and/or any other similar actions. The privacy engine 118 may use a combination of privacy policies 120, privacy rules 122, and/or privacy models 124 to determine whether to perform an action and/or instruction the client device 102 to perform an action.

In some implementations, the privacy engine 118 may implement a service for which the user 104 opts in. In some instances, the user 104 may pay a subscription fee to benefit from the services of the privacy engine 118. The privacy engine subscribers 134 may include a list of users who are eligible to subscribe to the service of the privacy engine 118. Those users who are active subscribers to the service of the privacy engine 118 may be noted. Before the privacy engine 118 determines whether to perform an action to mitigate a privacy risk, the privacy engine 118 may determine whether the user 104 is included in the privacy engine subscribers 134. In some implementations, the privacy sensor 114 may identify instances where a privacy breach is likely if the user 104 is included in the privacy engine subscribers 134. In some implementations, the privacy sensor 114 and the privacy engine 118 may identify instances where a privacy breach is likely and identify an action to remediate that risk even if the user 104 is not included in the privacy engine subscribers 134.

The privacy engine 118 may be implemented by the network server 110 that is included in a wireless carrier network that provides voice and data communication services to multiple client devices, such as the client device 102, the computing device 106, and other similar devices. The wireless carrier network may provide telecommunication and data communication in accordance with one or more technical standards, such as Enhanced Data Rates for GSM Evolution (EDGE), Wideband Code Division Multiple Access (W-CDMA), High Speed Packed Access (HSPA), Long Term Evolution (LTE), 5th Generation (5G) wireless systems, CDMA-2000 (Code Division Multiple Access 2000), and/or other similar standards.

The wireless carrier network may include a radio access network and a core network 136. The radio access network may include multiple base stations. The multiple base stations are responsible for handling voice and data traffic between multiple subscriber devices, such as the client device 102 and the computing device 106, and the core network 136. Accordingly, each of the base stations may provide a corresponding network cell that delivers telecommunication and data communication coverage. The core network 136 may use the network cells to provide communication services to the multiple subscriber devices. For example, the core network 136 may connect the multiple subscriber devices to other telecommunication and data communication networks, such as the Internet and the public switched telephone network (PSTN). The base stations are responsible for handling voice and data traffic between user devices and the core network 136. In some implementations, the base stations may be in the form of eNodeB nodes. Each eNodeB node may include a base transceiver system (BTS) that communicates via an antenna system over an air-link with one or more user devices that are within range. The antenna system of an eNodeB node may include multiple antennas that are mounted on a radio tower to provide a coverage area that is referred to as a "cell."

The privacy policy 120 may include preferences and/or setting of the user 104 and/or policies of the wireless carrier network. A setting of the user 104 may indicate that the user 104 prefers to encrypt communications when there is a risk of a privacy breach. Another setting of the user 104 may indicate that the lowest video resolution that the user 104 wishes to transmit is 1080p resolution. A policy of wireless carrier network may indicate that communications should be encrypted when there is a risk of a privacy breach and the data is routed through a third-party.

The user 104 may periodically update the privacy policy 120. The user 104 may access a privacy application 140 on the client device 102 that interfaces with the privacy engine 118. The user 104 may select various privacy options and preferences from the privacy application 140. The privacy options and preferences may include the adjustments that are acceptable to the user 104, the adjustments that are unacceptable to the user 104, the time ranges where the adjustments may occur, and/or any other similar preferences. The privacy engine 118 stores the updates in the privacy policy 120. The wireless carrier may also update the privacy policy 120 by providing updated settings and preferences to the privacy engine 118. The privacy application 140 may also be configured to interface with the network server 110 and exchange data related to the device settings 112 of the client device 102, the initialization data 138, instructions to adjust the device settings 112, and/or any other similar data.

The privacy rules 122 may indicate various actions that the privacy engine 118 should take based on the device settings 112 of the client device 102, the type of data that the client device 102 is prepared to transmit, the likelihood of a privacy breach, and/or any other similar factors. An example privacy rule may indicate that the resolution of video data should be reduced if the resolution is 4K or higher and if there is a possibility of a privacy breach. Another privacy rule 122 may indicate that audio data should be down sampled if the sampling rate is 88.2 kilohertz or higher and if there is a possibility of a privacy breach.

The wireless carrier may update the privacy rules 122 periodically. If the wireless carrier determines that privacy breaches have increased when certain scenarios exist, then the wireless carrier can update the privacy rules 122. If new technologies are developed that allow a user's privacy to be breached, then the wireless carrier can update the privacy rules 122 to account for that new technology. For example, artificial intelligence techniques may change rapidly and may allow identifying a person based on data that may not not have previously been able to identify a person. The wireless carrier may update the privacy rules 122 to decrease the likelihood of a privacy breach based on the improved artificial intelligence techniques.

The privacy models 124 may be configured to receive the video call initialization data 138, a type of data that the client device 102 is prepared to transmit, and/or any other similar inputs. The privacy models 124 may output data indicating an adjustment to the device settings 112 of the client device 102. In some implementations, the privacy models 124 may output data indicating an adjustment performed by the network server 110, for example, encrypting the data before transmitting to the computing device 106. By implementing the adjustment to the device settings 112, the likelihood of a privacy breach is reduced.

The privacy models 124 may include various models that the model trainer 126 trained using the historical data 128 and machine learning. The historical data 128 may include the settings of a client device, the type of data transmitted by the client device, whether a privacy breach occurred, the settings of a recipient device, a route of the data from the client device to the recipient device, and/or any other type of data. The model trainer 126 may be configured to train the privacy models 124 so they are configured to output different data than models used by the privacy sensor 114. While the models used by the privacy sensor 114 may output data indicating the likelihood of a privacy breach, the privacy models 124 may output data indicating an adjustment to the device settings 112 that decreases the likelihood of a privacy breach.

To train the privacy models 124 to output data indicating an adjustment to the device settings 112 that decreases the likelihood of a privacy breach, the model trainer 126 may generate data samples from the historical data 128 by separating the initialization data 138, the device settings 112, data identifying the type of data, data indicating whether a privacy breach occurred, and/or other similar data into groups collected at two different times and that differ by one part of the data. For example, a data sample may include data indicating that video data was transmitted with a 4K resolution with no encryption and no privacy breach occurred. That same data sample may also include data indicating that video data was transmitted with a 1080p resolution with no encryption and no privacy breach occurred. Using other data samples similar to this data samples, the model trainer 126 may train a model to output a change to the video resolution that decreases the risk of a privacy breach.

The model trainer 126 may train multiple models using each group of data samples. Each model may be configured to receive different data and output an adjustment to the device settings 112 to decrease the likelihood of a privacy breach. The privacy engine 118 may use a combination of the privacy rules 122 and the privacy models 124 to output an adjustment to the device settings 112. In some implementations, the privacy engine 118 may provide the initialization data 138, the device settings 112, and the data identifying the type of data to the privacy models 124. The privacy model may output data indicating an adjustment to the device settings 112. The privacy engine 118 may provide the same initialization data, the device settings 112, and the data identifying the type of data to the privacy rules 122. The privacy rules 122 may output data indicating an adjustment to the device settings 112. If the privacy rules 122 and the privacy models 124 output a similar adjustment, then the privacy engine 118 may output that adjustment. If the privacy rules 122 and the privacy models 124 output different adjustments, then the privacy engine 118 may output the adjustment based on a predetermined preference between the privacy rules 122 and the privacy models 124, an average of the two adjustments, and/or any other similar combination of the two.

In some instances, the privacy rules 122 and/or the privacy models 124 may indicate that adjusting the device settings 112 may not decrease the likelihood of a privacy breach. This may occur if the privacy models output an adjustment that indicates the same settings that already exist in the device settings 112. For example, if the device settings 112 indicate that the video resolution is 720p and the privacy models 124 and privacy rules 122 indicate to adjust the video resolution to 720p, then the privacy engine 118 may take no additional action.

In stage C, the privacy engine 118 determines that adjusting the device settings 112 may reduce the likelihood of a privacy breach and provides data indicating the adjustment to the prompt generator 130 and/or the settings adjuster 132. The user 104 may indicate a preference for whether the privacy engine 118 should automatically implement the adjustment to decrease the likelihood of a privacy breach. If the settings indicate to automatically implement the adjustment, then the privacy engine 118 provides data indicating the adjustment to the settings adjuster 132. If the settings indicate that the user 104 should approve the adjustment, then the privacy engine 118 provides data indicating the adjustment to the prompt generator 130.

In some implementations, the type of adjustment may dictate whether the privacy engine 118 provides the data indicating the adjustment to the prompt generator 130 or the settings adjuster 132. Some types of adjustments may require approval by the user 104 before implementing. Some types of adjustments may not require approval by the user 104 before implementing. For example, adjustments that may have little effect on the experience of the user 104 may not require approval. These adjustments may include reducing the resolution of a video call from 4K to 1080p when the client device 102 and/or the computing device 106 are not capable of displaying 4K resolution. Another adjustment may include encrypting the data when the processing capabilities and/or excess computing capacity of the client device 102 and/or the computing device 106 are above a threshold. Examples of adjustments that may require approval by the user 104 before implementing may include reducing the resolution of a video call from 4K to 1080p when the client device 102 and/or the computing device 106 are both capable of displaying 4K resolution. Another example adjustment may include encrypting the data when the processing capabilities and/or excess computing capacity of the client device 102 and/or the computing device 106 are below a threshold.

In instances where the privacy engine 118 determines to provide the data indicating the adjustment to the prompt generator 130, the prompt generate 130 generates a GUI that indicates the adjustment, a selectable option to implement the adjustment, and a selectable option to reject the adjustment. The GUI may indicate that the adjustment may affect the performance of the client device 102 and/or the quality of the data exchanged between the client device 102 and the computing device 106. The prompt generator 130 may provide the prompt to the client device 102. If the user 104 rejects the adjustment, then the privacy engine 118 takes no further action and does not implement the adjustment. If the user accepts the adjustment, then the privacy engine 118 provides the adjustment to the settings adjuster 132 for implementing.

In stage D, the settings adjuster 132 provides an instruction to the client device 102 to implement the adjustment identified by the client device. For example, the adjustment may indicate to reduce the resolution of the video data from 4K to 720p. The adjustment may apply to the current session and not future sessions. In some instances, the adjustment may apply to future sessions until the user 104 changes the device settings 112. In some implementations, the adjustments may expire after a period of time and may revert to a default value specified by the user 104 and/or the wireless carrier.

In stage E, the client device 102 and the computing device 106 exchange video call data. The client device 102 transmits video data to the computing device 106 using the adjusted settings that are intended to reduce the likelihood of a privacy breach. By reducing the resolution of the video data from 4K to 720p, the privacy engine 118 reduces the likelihood of the privacy of the user 104 being breached. A privacy breach may occur because another user may be able to extract health related information from a video stream with a 4K resolution.

In some implementations, the model trainer 126 may receive data indicating whether a privacy breach occurred. The model trainer 126 may use this data to update the historical data 128 and retrain the privacy models 124. The data indicating whether a privacy breach occurred may be based on whether an unauthorized third party intercepted the video data and/or data provided by the user 104. The model trainer 126 may update the historical data 128 to include a new data sample that includes the initialization data 138, the device settings 112 before and after the adjustment, data identifying the type of data, and data indicating whether a privacy breach occurred. With the new data sample, the model trainer 126 may update the privacy models 124. The privacy engine 118 may use the updated privacy models 124 to analyze initialization data, device settings, data types, and/or any other similar information in the future.

In some implementations, the client device 102 may be configured to detect changes in the way that the user 104 is communicating with the client device 102. The types of changes that the client device 102 is configured to detect may include actions that suggest that what the user 104 is saying or doing may be sensitive. The client device 102 may store data identifying preidentified actions such as whispering, the voice of the user 104 changing tone or cadence, hand gestures, speaking specific phrases, and/or any other similar actions. The client device 102 may analyze the received audio or video data. If the client device 102 determines that the audio or video data depicts one of the predefined actions, then the client device 102 may automatically implement any actions identified by the network server 110 for reducing the likelihood of a privacy breach and not be accepted by the user 104. In this case, if the user 104 declines the decrease in the video resolution from 4K to 720p, and the client device 102 detects that the user 104 begins whispering, then the client device 102 may reduce the resolution from 4K to 720p for the period where the user 104 is whispering.

Figure 2:
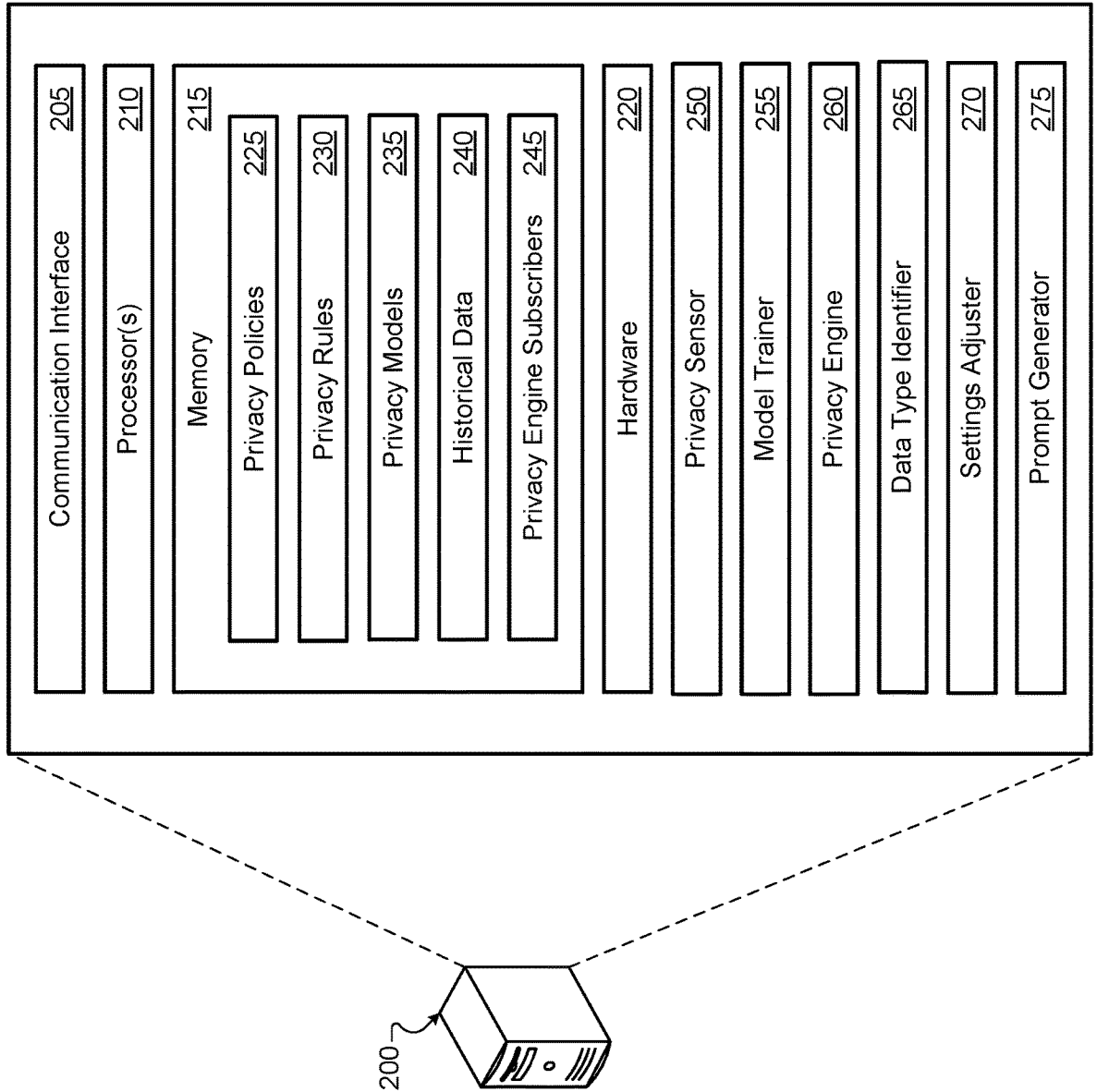
FIG. 2 illustrates an example server for ensuring the privacy of a user.

FIG. 2 illustrates an example server 200 for ensuring the privacy of a user. The server 200 may be any type of computing device that is configured to be integrated into a wireless carrier network. For example, the server 200 may be similar to the network server 110 of FIG. 1. Some of the components of the server 200 may be implemented in a single computing device or distributed over multiple computing devices. Some of the components may be in the form of virtual machines or software containers that are hosted in a cloud in communication with disaggregated storage devices.

The server 200 may include a communication interface 205, one or more processors 210, memory 215, and hardware 220. The communication interface 205 may include communication components that enable the server 200 to transmit data to and receive data from devices connected to the wireless carrier network. The communication interface 205 may include a cellular interface that is configured to communicate with base stations of a wireless carrier network. The communication interface 205 may receive data that other devices transmit to the base stations and/or transmit data to the base stations for transmission to the other devices.

The hardware 220 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 215 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 210 may implement a privacy sensor 250 and a data type identifier 265. The privacy sensor 250 may be similar to the privacy sensor 114 of FIG. 1, and the data type identifier 265 may be similar to the data type identifier 116 of FIG. 1. The privacy sensor 250 may be configured to determine when a privacy breach may be possible, and the data type identifier 265 may be configured to determine a type of data that a subscriber device is prepared to transmit. The server 200 may receive initialization data from the subscriber device indicating that the subscriber device is prepared to transmit data to another device through the server 200. The initialization data may identify the data that the subscriber device is prepared to transmit and characteristics of that data.

The privacy sensor 250 may provide the initialization data to the data type identifier 265. The data type identifier 265 may determine a type of the data that the subscriber device is prepared to transmit. The data type identifier 265 may be configured to classify the data and assign a data type to the data from a group of predetermined data types. For example, the data types may include video data, audio data, text data, image data, streaming data, and/or any similar type of data. In some implementations, the data type identifier 265 may determine that the subscriber device is prepared to transmit more than one type of data as may be the case with a text message with a photo attached.

The privacy sensor 250 may use the privacy rules 230 and/or the privacy models 235 to determine whether a privacy breach is likely to occur when the subscriber device transmits the data. The privacy rules 230 may compare the initialization data and the type of data to one or more rules that determine whether a privacy breach is likely to occur. The rules may generate a privacy breach score that indicates a likelihood of a privacy breach. A higher privacy breach score may indicate a higher likelihood of a privacy breach. For example, a rule may indicate that a video stream that depicts a user at 4K resolution has a privacy breach score of 0.5. That same rule may indicate that a video stream that depicts a user at a 720p resolution has a privacy breach score of 0.1. Another rule may generate a privacy breach score based on the sampling and bit rate of an audio stream that encodes the voice of a user.

The privacy sensor 250 may compare the privacy breach score to a threshold. If the privacy breach score satisfies the threshold, then the privacy sensor 250 may determine that a privacy breach may be possible. For example, if the privacy breach score is 0.5 and the threshold is 0.3, then the privacy sensor 250 may determine that a privacy breach may be possible. If the privacy breach score does not satisfy the threshold, then the privacy sensor 250 may determine that a privacy breach may not be possible or that a privacy breach is unlikely enough not to adjust any settings on the subscriber device. For example, if the privacy breach score is 0.1 and the threshold is 0.3, then the privacy sensor 250 may determine that a privacy breach may not be possible. In some implementations, the user may be able to adjust the threshold depending on the user's tolerance for privacy risks.

In some implementations, the privacy sensor 250 may use one or more privacy models that are each configured to receive data indicating the settings of the subscriber device, data identifying the type of data that the subscriber device is prepared to transmit, and/or any additional data. The privacy models 235 may be configured to output a privacy breach score and/or an indication whether a privacy breach is likely. The model trainer 255 may train the model using machine learning and historical data 240. The historical data 240 may include the settings of a subscriber device, the type of data transmitted by the subscriber device, whether a privacy breach occurred, and/or any other type of data.

In some implementations, the model trainer 255 may be configured to retrain the model based on data received after the subscriber device transmits the data. Based on the model, the initialization data, the data indicating the settings of the subscriber device, data identifying the type of data that the subscriber device is prepared to transmit, the privacy sensor 250 may indicate a privacy breach score of 0.5. The model trainer 255 may receive data indicating that a privacy breach did not occur. If no settings changed on the subscriber device, then the model trainer 255 may add the initialization data, the type of data, the data indicating the settings of the subscriber device, and data indicating that a privacy breach did not occur to the historical data 240. The model trainer 255 may update the model using machine learning and the updated historical data 240.

The one or more processors 210 may implement a privacy engine 260. The privacy engine 260 may be similar to the privacy engine 118 of FIG. 1. The privacy engine 260 may be configured to identify actions that may mitigate the possibility of a privacy breach. The actions may include encrypting a data stream, adjusting the resolution of video data, adjusting the sample rate and/or bitrate of audio data, alerting the user, and/or any other similar actions. The privacy engine 260 may use a combination of privacy policies 225, privacy rules 230, and/or privacy models 235 to determine whether to perform an action and/or instruct the subscriber device to perform an action.

In some implementations, the privacy engine 260 may implement a service for which a user signs up. In some instances, the user may pay a subscription fee to benefit from the services of the privacy engine 260. The privacy engine subscribers 245 may include a list of users who are active subscribers to the service of the privacy engine 260. Before the privacy engine 260 determines whether to perform an action to mitigate a privacy risk, the privacy engine 260 may determine whether the user is included in the privacy engine subscribers 245. In some implementations, the privacy sensor 250 may identify instances where a privacy breach is likely if the user is included in the privacy engine subscribers 245. In some implementations, the privacy sensor 250 and the privacy engine 260 may identify instances where a privacy breach is likely and identify an action to remediate that risk even if the user is not included in the privacy engine subscribers 245.

The privacy policies 225 may include preferences and/or settings of various users and/or policies of the wireless carrier network. A setting of a user may indicate that the user prefers to encrypt communications when there is a risk of a privacy breach. Another setting of the user may indicate that the lowest video resolution that the user wishes to transmit is 1080p resolution. A policy of a wireless carrier network may indicate that communications should be encrypted when there is a risk of a privacy breach and the data is routed through a third-party.

The privacy rules 230 may indicate various actions that the privacy engine 260 should take based on the settings of the subscriber device, the type of data that the subscriber device is prepared to transmit, the likelihood of a privacy breach, and/or any other similar factors. An example privacy rule may indicate that the resolution of video data should be reduced if the resolution is 4K or higher and if there is a possibility of a privacy breach. Another privacy rule 230 may indicate that audio data should be down sampled if the sampling rate is 88.2 kilohertz or higher and if there is a possibility of a privacy breach.

The privacy models 235 may be configured to receive initialization data, data identifying a type of data that the subscriber device is prepared to transmit, and/or any other similar inputs. The privacy models 235 may output data indicating an adjustment to the subscriber device. By implementing the adjustment to the subscriber device, the likelihood of a privacy breach is reduced.

The privacy models 235 may include various models that the model trainer 255 trained using the historical data 240 and machine learning. The historical data 240 may include the settings of a subscriber device, the type of data transmitted by the subscriber device, whether a privacy breach occurred, the settings of a recipient device, a route of the data from the subscriber device to the recipient device, and/or any other type of data. The model trainer 255 may be configured to train the privacy models 235 so they are configured to output data different than models used by the privacy sensor 250. While the models used by the privacy sensor 250 may output data indicating the likelihood of a privacy breach, the privacy models used by the privacy engine 260 may output data indicating an adjustment to the device settings that decreases the likelihood of a privacy breach.

To train the privacy models 235 to output data indicating an adjustment to the settings of the subscriber devices that decreases the likelihood of a privacy breach, the model trainer 255 may generate data samples from the historical data 240 that includes the initialization data, device setting data, data identifying the type of data, data indicating whether a privacy breach occurred, and/or other similar data into groups collected at two different times and that differ by one part of the data. The model trainer 255 may train various models using different groups of data samples. Each model may be configured to receive different types of data. For example, a model may be configured to receive device setting data and data identifying the type of data. Another model may be configured to receive initialization data and device setting data. Each model may be configured to output data indicating an adjustment to the settings of the subscriber device.

The privacy engine 260 may be configured to select the appropriate model based on the data received from the subscriber device. The privacy engine 260 may select the model that is configured to receive the data received from the subscriber device. For example, if the privacy engine 260 receives device setting data and data identifying the type of data, then the privacy engine 260 selects a privacy model 235 that is configured to receive those inputs.

In some instances, the privacy rules 230 and/or the privacy models 235 may indicate that adjusting the device settings may not decrease the likelihood of a privacy breach. This may occur if the privacy models output an adjustment that indicates the same settings that already exist in the device settings. For example, if the device settings of the subscriber device indicate that the video resolution is 720p and the privacy models 235 and privacy rules 230 indicate to adjust the video resolution to 720p, then the privacy engine 260 may take no additional action.

In some instances, the outputs of the privacy models 235 and the privacy rules 230 may conflict. A conflict may exist when the two actions identified by the privacy models 235 and the privacy rules 230 may not be able to be implemented at the same time. For example, if the privacy models 235 indicate to adjust the resolution to 1080p, and the privacy rules 230 indicate to adjust the resolution to 720p, then privacy engine 260 may select between the two actions. The privacy engine 260 may combine the two resolutions by averaging the two resolutions and round the result. If the privacy engine 260 is unable to implement or combine both actions, then the privacy engine 260 may select one of the actions automatically or by requesting that the user select an action. In some instances, the actions may be able to both be implemented. For example, the privacy models 235 indicate to adjust the resolution to 1080p, and the privacy rules 230 indicate to encrypt the video data. In this case, the privacy engine 260 may attempt to perform both actions.

The one or more processors 210 may implement a settings adjuster 270. The settings adjuster 270 may be similar to the settings adjuster 132 of FIG. 1. The settings adjuster 270 may be configured to automatically implement the action identified by the privacy engine 260. The settings adjuster 270 may automatically provide an instruction to the subscriber device to implement the action. The action may adjust settings that are configurable by a user and/or settings that the server 200 is able to adjust and not the user. In some implementations, the settings adjuster 270 may be configured to use the prompt generator 275 to determine whether the user of the subscriber device accepts the actions. The prompt generator 275 may generate a GUI and transmit the GUI to the subscriber device. The GUI may request that the user grant permission to perform the action or actions that mitigate the privacy risk. If the user grants permission, then the settings adjuster 270 instructs the subscriber device to perform the action or actions.

In some implementations, the server 200 may receive data indicating whether a privacy breach occurred during transmission of the data. The data indicating whether a privacy breach occurred may be based on the data being intercepted or not intercepted by a third party and/or data received from the user. The server 200 may update the historical data 240 with the settings of the subscriber device before and after settings change, the type of data transmitted by the subscriber device, the initialization data, and/or any other similar data. The model trainer 255 may update the privacy models 235 using the updated historical data 240 and using machine learning. In some instances, the server 200 may be unable to determine whether a privacy breach occurred. In this case, the server 200 may not add to the historical data 240 and may not update the privacy models 235.

Figure 3:
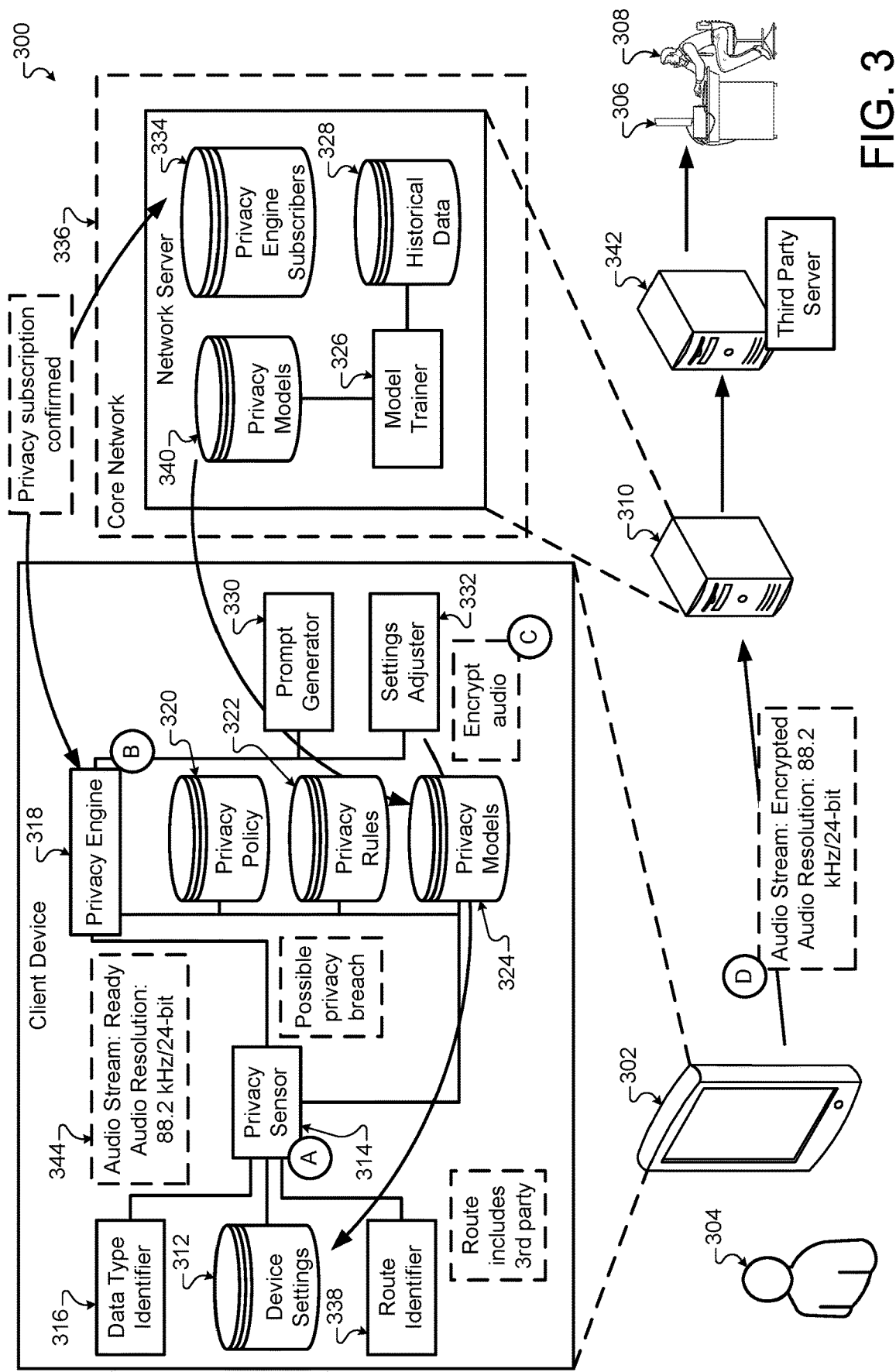
FIG. 3 illustrates an example system for ensuring the privacy of a user by encrypting an audio stream.

FIG. 3 illustrates an example system 300 for ensuring the privacy of a user 304 by encrypting an audio stream. Briefly, and as described in more detail below, the user 304 is using the client device 302 to attempt to communicate with the user 308. The client device 302 is connected to a wireless carrier network that includes the network server 310. The client device 302 determines that the privacy of the user 304 may be breached while communicating with the user 308. Based on that determination, the client device 302 adjusts a setting to decrease the likelihood that the privacy of the user 104 may be breached. While the example in FIG. 3 illustrates the user 304 and user 308 communicating through an audio call, the adjustments to the client device 302 may occur if the client device 302 and the computing device 306 are communicating through another technique such as video, text, or any other similar technique.

In more detail, and in stage A, the user 304 begins the process of setting up an audio call with the user 308. This process may include accessing an audio call application on the client device 302. The audio call application may use either a data or voice connection. The user 304 may select the user 308 from a contacts list and ensure that the audio call application is able to access the microphone. The client device 302 may access the device settings 312 to determine the sampling frequency and bitrate for the audio. The user 304 may set the device settings 312 and indicate that the default sampling frequency should be 88.2 kilohertz and the bitrate should be twenty-four bits. Before connecting with the computing device 306 of the user 308, the client device 302 may access the privacy sensor 314 to determine whether there is a risk of a privacy breach during the audio call.

The privacy sensor 314 may be configured to determine when a privacy breach may be possible. The privacy sensor 314 may determine that a privacy breach is possible based on data indicating that the client device is prepared to transmit data, the device settings 312 of the client device 302, a route that the data will likely travel from the client device 302 to the computing device 306, and data from the data type identifier 316. The data type identifier 316 may be configured to determine the type of data that the client device 302 is prepared to transmit to the computing device 306. The data type identifier 316 may determine that the client device 302 is prepared to stream audio data based on initialization data indicating that the user 304 accessed the audio call application. The data type identifier 316 may identify other types of data such as audio data, text data, image data, and/or any other type of similar data. The data type identifier 116 may also determine whether the data is streaming data. For example, the audio data in an audio call is streaming data, and text data from an email may not be streaming data.

The privacy sensor 314 may also access data from a route identifier 338. The route identifier 338 may determine and/or receive data indicating a likely route for the data from the client device 302 to the computing device 306. The route identifier 338 may receive data from the network server 310 that indicates a likely route of the data. In some implementations, the route identifier 338 and/or the network server 310 may determine the likely route based on the location of the client device 302 and/or the location of the computing device 306. In some implementations, the route identifier 338 and/or the network server 310 may determine the likely route based on a service provider to the computing device 306. In the example of FIG. 3, the route identifier 338 may determine that the route likely includes the third-party server 342.

The privacy sensor 314 receives data from the data type identifier 316, data from the device settings 312, data from the route identifier 338, and/or any other similar data. The privacy sensor 314 may use one or more rules to determine when a privacy breach may be possible. The rules may use the type of data that the client device 302 is prepared to transmit, a setting of the client device 302, the identity of the recipient, the route of the data from the client device 302 to the computing device 306, and/or any other similar information to determine whether a privacy breach may be possible. The rules may generate a privacy breach score that indicates a likelihood of a privacy breach. A higher privacy breach score may indicate a higher likelihood of a privacy breach. For example, a rule may indicate that an audio stream that has sampling frequency of 88.2 kilohertz and a bitrate of twenty-four bits and where the audio stream travels through the third-party server 342 has a privacy breach score of 0.5. That same rule may indicate that a video stream that has sampling frequency of 88.2 kilohertz and a bitrate of twenty-four bits and where the audio stream does not pass through a third-party server has a privacy breach score of 0.1.

The privacy sensor 314 may compare the privacy breach score to a threshold. If the privacy breach score satisfies the threshold, then the privacy sensor 314 may determine that a privacy breach may be possible. For example, if the privacy breach score is 0.5 and the threshold is 0.3, then the privacy sensor 314 may determine that a privacy breach may be possible. If the privacy breach score does not satisfy the threshold, then the privacy sensor 314 may determine that a privacy breach may not be possible or that a privacy breach is unlikely enough not to adjust any settings on the client device 302. For example, if the privacy breach score is 0.1 and the threshold is 0.3, then the privacy sensor 314 may determine that a privacy breach may not be possible. In some implementations, the user 304 may be able to set the threshold as a way of indicating the level of risk that the user 304 is comfortable with regarding breaches of privacy.

In some implementations, the privacy sensor 314 may use a model that is configured to receive data indicating the settings of the client device 302, data identifying the type of data that the client device 302 is prepared to transmit, data indicating a likely route of the data, and/or any additional data. The model may be configured to output a privacy breach score and/or an indication whether a privacy breach is likely. The model trainer 326 may train the model using machine learning and historical data 328. The historical data 328 may include the settings of a client device, the type of data transmitted by the client device, a route of the data, whether a privacy breach occurred, and/or any other type of data. The model trainer 326 may provide the models to the privacy models 324 for use by the privacy sensor 314. The network server 310 may implement the model trainer 326 and provide the trained models to the client device 302.

In some implementations, the model trainer 326 may be configured to retrain the model based on data received after the client device 302 transmits the data. Based on the model, the initialization data 344, the route of the data from the route identifier 338, and the type of data from the data type identifier 116, the privacy sensor 114 may indicate a privacy breach score of 0.5. The model trainer 126 may receive data indicating that a privacy breach did not occur. If no settings changed on the client device 302, then the model trainer 126 may add the initialization data 344, the type of data from the data type identifier 316, the route data, and data indicating that a privacy breach did not occur to the historical data 328. The model trainer 326 may update the model using machine learning and the updated historical data 328.

In the example of FIG. 3, the privacy sensor 314 receives the initialization data 344 indicating that the client device 302 is prepared to stream audio data with a sampling frequency of 88.2 kilohertz and a bitrate of twenty-four bits. The data type identifier 316 determines that type of data that the client device 302 is prepared to transmit is audio data. The route identifier 338 may indicate that the route of the audio data will likely include a third-party server 342. Based on those inputs, the privacy sensor 314 uses rules and/or models and determines that a privacy breach is possible and/or likely. The privacy sensor 314 provides data indicating that a privacy breach is possible and/or likely to the privacy engine 318.

In stage B, the privacy engine 318 receives the data indicating that a privacy breach is possible and/or likely. The privacy engine 318 may be configured to identify actions that may mitigate the possibility of a privacy breach. The actions may include encrypting a data stream, adjusting the resolution of video data, adjusting the sample rate and/or bitrate of audio data, alerting the user, and/or any other similar actions. The privacy engine 318 may use a combination of privacy policies 320, privacy rules 322, and/or privacy models 324 to determine whether to perform an action and/or instruction the client device 302 to perform an action.

In some implementations, the privacy engine 318 may implement a service for which the user 304 signs up. In some instances, the user 304 may pay a subscription fee to benefit from the services of the privacy engine 318. The network server 310 may maintain the privacy engine subscribers 334 that may include a list of users who are active subscribers to the service of the privacy engine 318. Before the privacy engine 318 determines whether to perform an action to mitigate a privacy risk, the privacy engine 118 may request that the network server 310 confirm whether the user is authorized to utilize the privacy engine 318. If network server 310 confirms that the user 304 is included in the privacy engine subscribers 334, then the network server 310 may transmit an indication to the privacy engine 318 that the user 304 is authorized to use the privacy engine 318. If the network server 310 determines that the user 304 is not included in the privacy engine subscribers 334, then the network server 310 may transmit an indication to the privacy engine 318 that the user 304 is not authorized to use the privacy engine 318. At this point, the privacy engine 318 may not attempt to identify an action to reduce the likelihood of a privacy breach, and the audio call between the user 304 and the user 308 may continue without changing the device settings 312.

The privacy sensor 314 may identify instances where a privacy breach is likely if the network server 310 indicates that the user 304 has permission to use the privacy engine 318. In some implementations, the privacy sensor 314 and the privacy engine 318 may identify instances where a privacy breach is likely and identify an action to remediate that risk even if the network server 310 indicates that the user 304 does not have permission to use the privacy engine 318.

In some implementations, the privacy engine 318 may be configured to notify the user 304 when a privacy breach is likely to occur even if the user 304 is not authorized to use the privacy engine 318. In this case, the privacy engine 318 may not take any automatic action to reduce the privacy risk. The privacy engine 318 may alert the user 304, and the user 304 can take any action.

The network server 310 is included in a wireless carrier network that provides voice and data communication services to multiple client devices, such as the client device 302, the computing device 306, and other similar devices. The wireless carrier network may provide telecommunication and data communication in accordance with one or more technical standards, such as Enhanced Data Rates for GSM Evolution (EDGE), Wideband Code Division Multiple Access (W-CDMA), High Speed Packed Access (HSPA), Long Term Evolution (LTE), 5th Generation (5G) wireless systems, CDMA-2000 (Code Division Multiple Access 2000), and/or other similar standards.

The wireless carrier network may include a radio access network and a core network 336. The radio access network may include multiple base stations. The multiple base stations are responsible for handling voice and data traffic between multiple subscriber devices, such as the client device 302 and the computing device 306, and the core network 336. Accordingly, each of the base stations may provide a corresponding network cell that delivers telecommunication and data communication coverage. The core network 336 may use the network cells to provide communication services to the multiple subscriber devices. For example, the core network 136 may connect the multiple subscriber devices to other telecommunication and data communication networks, such as the Internet and the public switched telephone network (PSTN). The base stations are responsible handling voice and data traffic between user devices and the core network 336. In some implementations, the base stations may be in the form of eNodeB nodes. Each eNodeB node may include a base transceiver system (BTS) that communicates via an antenna system over an air-link with one or more user devices that are within range. The antenna system of an eNodeB node may include multiple antennas that are mounted on a radio tower to provide a coverage area that is referred to as a "cell." The BTS may send RF signals to user devices and receive radio signals from subscriber devices.

The privacy policy 320 may include preferences and/or setting of the user 304 and/or policies of the wireless carrier network. A setting of the user 304 may indicate that the user 304 prefers to encrypt communications when there is a risk of a privacy breach. Another setting of the user 304 may indicate that the lowest video resolution that the user 304 wishes to transmit is 1080p resolution. A policy of wireless carrier network may indicate that communications should be encrypted when there is a risk of a privacy breach and the data is routed through a third-party.

The user 304 may periodically update the privacy policy 320. The user 304 may access an application on the client device 302 that interfaces with the privacy engine 318. The user 304 may select various privacy options and preferences from the application. The privacy engine 318 stores the updates in the privacy policy 320. The wireless carrier may also update the privacy policy 320 by providing updated settings and preferences to the privacy engine 318.

The privacy rules 322 may indicate various actions that the privacy engine 318 should take based on the device settings 312 of the client device 302, the type of data that the client device 302 is prepared to transmit, the likelihood of a privacy breach, the route of the data between the client device 302 and the computing device 306, and/or any other similar factors. An example privacy rule may indicate that the resolution of video data should be reduced if the resolution is 4K or higher and if there is a possibility of a privacy breach. Another privacy rule 322 may indicate that audio data should be down sampled if the sampling rate is 88.2 kilohertz or higher and if there is a possibility of a privacy breach.

The wireless carrier may update the privacy rules 322 periodically. If the wireless carrier determines that privacy breaches have increased when certain scenarios exist, then the wireless carrier can update the privacy rules 322. If new technologies are developed that allow a user's privacy to be breached, then the wireless carrier can update the privacy rules 322 to account for that new technology. For example, artificial intelligence techniques may change rapidly and may allow identifying a person based on data that may not have previously been able to identify a person. The wireless carrier may update the privacy rules 322 to decrease the likelihood of a privacy breach based on the improved artificial intelligence techniques.

The privacy models 324 may be configured to receive the initialization data 344, a type of data that the client device 302 is prepared to transmit, the route of the data from the client device 302 to the computing device 306, and/or any other similar inputs. The privacy models 324 may output data indicating an adjustment to the device settings 312 of the client device 302. By implementing the adjustment to the device settings 312, the likelihood of a privacy breach is reduced.

The privacy models 324 may include various models that the model trainer 326 trained using the historical data 328 and machine learning. The historical data 328 may include the settings of a client device, the type of data transmitted by the client device, whether a privacy breach occurred, the settings of a recipient device, a route of the data from the client device to the recipient device, and/or any other type of data. The model trainer 326 may be configured to train the privacy models 324 so they are configured to output different data than models used by the privacy sensor 314. While the models used by the privacy sensor 314 may output data indicating the likelihood of a privacy breach, the privacy models 324 may output data indicating an adjustment to the device settings 312 that decreases the likelihood of a privacy breach.

To train the privacy models 324 to output data indicating an adjustment to the device settings 312 that decreases the likelihood of a privacy breach, the model trainer 326 may generate data samples from the historical data 328 by separating the initialization data 344, the device settings 312, data identifying the type of data, data indicating whether a privacy breach occurred, route data, and/or other similar data into groups collected at two different times and that differ by one part of the data. For example, a data sample may include data indicating that audio data was transmitted with an 88.2 kilohertz sampling rate with no encryption and no privacy breach occurred. That same data sample may also include data indicating that audio data was transmitted with a 44.1 kilohertz sampling rate with no encryption and no privacy breach occurred. Using other data samples similar to this data sample, the model trainer 326 may train a model to output a change to the audio sampling rate that decreases the risk of a privacy breach.

The model trainer 326 may train multiple models using each group of data samples. Each model may be configured to receive different data and output an adjustment to the device settings 312 to decrease the likelihood of a privacy breach. The privacy engine 318 may use a combination of the privacy rules 322 and the privacy models 324 to output an adjustment to the device settings 312. In some implementations, the privacy engine 318 may provide the initialization data 344, the device settings 312, and the data identifying the type of data to the privacy models 324. The privacy model may output data indicating an adjustment to the device settings 312. The privacy engine 318 may provide the same initialization data 344, the device settings 312, and the data identifying the type of data to the privacy rules 322. The privacy rules 322 may output data indicating an adjustment to the device settings 312. If the privacy rules 322 and the privacy models 324 output a similar adjustment, then the privacy engine 318 may output that adjustment. If the privacy rules 322 and the privacy models 324 output different adjustments, then the privacy engine 318 may output the adjustment based on a predetermined preference between the privacy rules 322 and the privacy models 324, an average of the two adjustments, and/or any other similar combination of the two.

In some instances, the privacy rules 322 and/or the privacy models 324 may indicate that adjusting the device settings 312 may not decrease the likelihood of a privacy breach. This may occur if the privacy models output an adjustment that indicates the same settings that already exist in the device settings 312. For example, if the device settings indicate that the audio data is encrypted and the privacy rules 322 indicate to encrypt the data, then the privacy engine 318 may take no additional action.

In stage C, the privacy engine 318 determines that adjusting the device settings 312 may reduce the likelihood of a privacy breach and provides data indicating the adjustment to the prompt generator 330 and/or the settings adjuster 332. The user 304 may indicate a preference for whether the privacy engine 318 should automatically implement the adjustment to decrease the likelihood of a privacy breach. If the settings indicate to automatically implement the adjustment, then the privacy engine 318 provides data indicating the adjustment to the settings adjuster 332. If the settings indicate that the user 304 should approve the adjustment, then the privacy engine 318 provides data indicating the adjustment to the prompt generator 330.

In some implementations, the type of adjustment may dictate whether the privacy engine 318 provides the data indicating the adjustment to the prompt generator 330 or the settings adjuster 332. Some types of adjustments may require approval by the user 304 before implementing. Some types of adjustments may not require approval by the user 304 before implementing. For example, adjustments that may have little effect on the experience of the user 304 may not require approval. These adjustments may include reducing the sampling rate of an audio call from 88.2 kilohertz to 44.1 kilohertz when the computing device 306 down samples all or nearly all audio before outputting to the user 308. Another adjustment may include encrypting the data when the processing capabilities and/or excess computing capacity of the client device 302 and the computing device 306 are above a threshold. Examples of adjustments that may require approval by the user 304 before implementing reducing the sampling rate of an audio call from 88.2 kilohertz to 44.1 kilohertz when the computing device 306 includes audio equipment that is capable of processing the audio sampled at the higher rate. Another example adjustment may include encrypting the data when the processing capabilities and/or excess computing capacity of the client device 302 and the computing device 306 are below a threshold.

In instances where the privacy engine 318 determines to provide the data indicating the adjustment to the prompt generator 330, the prompt generator 330 generates a GUI that indicates the adjustment, a selectable option to implement the adjustment, and a selectable option to reject the adjustment. The GUI may indicate that the adjustment may affect the performance of the client device 302 and/or the quality of the data exchanged between the client device 302 and the computing device 306. The prompt generator 330 may provide the prompt to the client device 302. If the user 304 rejects the adjustment, then the privacy engine 318 takes no further action and does not implement the adjustment. If the user accepts the adjustment, then the privacy engine 318 provides the adjustment to the settings adjuster 332 for implementing.

In the example of FIG. 3, the privacy engine 318 determines to encrypt the audio data transmitted from the client device 302 to the computing device 306. The settings adjuster 332 receives the instruction to encrypt the audio data and updates the device settings 312. The adjustment may apply to the current session and not future sessions of transmitting audio data. In some instances, the adjustment may apply to future sessions until the user 304 changes the device settings 312.

In stage D, the client device 302 and the computing device 306 begin communicating by exchanging audio data. The route between the client device 302 and the computing device 306 includes the third-party server 342. The client device 302 detects the voice of the user 304, processes the audio of the voice using the 88.2 kilohertz sampling rate and twenty-four bit bitrate, and encrypts the processed audio. The client device 302 transmits the encrypted audio data to the computing device 106 and the likelihood of a privacy breach is reduced. A privacy breach may occur because the third-party server 342 handles the audio data and the wireless carrier network is unable to ensure the privacy of the user 304 when a third-party receives the data. With high quality voice data, the third-party server or another nefarious actor may be able to train a speech synthesis system to speak words in a voice that sounds similar to the user 304.

In some implementations, the model trainer 326 may receive data indicating whether a privacy breach occurred. The model trainer 326 may use this data to update the historical data 328 and retrain the privacy models 324. The data indicating whether a privacy breach occurred may be based on whether an unauthorized third party intercepted the video data and/or data provided by the user 304. The model trainer 326 may update the historical data 328 to include a new data sample that includes the initialization data 344, the device settings 312 before and after the adjustment, data identifying the type of data, data identifying the route of the data, and data indicating whether a privacy breach occurred. With the new data sample, the model trainer 326 may update the privacy models 324. The privacy engine 318 may use the updated privacy models 324 to analyze initialization data, device settings, data types, and/or any other similar information in the future.

In some implementations, the network server 310 may include a privacy sensor and a privacy engine with corresponding privacy policies, privacy rules, and privacy models in addition to the client device 302. In this case, the privacy sensor 314 and a privacy engine 318 with a corresponding privacy policy 320, privacy rules 322, and privacy models 324 may be part of local policies, rules, and models. The privacy sensor and a privacy engine with corresponding privacy policies, privacy rules, and privacy models on the network server 310 may be part of global policies, rules, and models. In instances, where the local and global policies determine to enact the same privacy adjustment, there may be no conflict between the two policies. In some instances, the local and global policies may determine to enact conflicting privacy adjustments, and the local and global privacy engines should determine what privacy adjustments to enact.

For example, a global privacy policy may request to use a firewall to block a port for both inbound and outbound. A local policy for the user 304 may indicate to allow inbound traffic on the port but block outbound traffic on the port. In some instances, the local policy may override the global policy based on user preferences or vice versa. The global policy can be put in place for certain scenarios based on the configuration of the wireless carrier network, and the local policy can be put in place for certain scenarios related to user configuration. When two users communicate with each other, their local policies may conflict, and the one with the more stringent user preference may be implemented. In some instances, if there is conflict between two user policies, the global policy may be implemented. The global policy may also be implemented if neither of the user has their own policy. As an example, a user may have local policy in place to block outputting video with a resolution of 4K. Another user may not have a local policy. In this case, the global policy may indicate to select the local policy in the case of one of the users not having a local policy. The result may be to block video with a resolution of 4K for both users.

In some implementations, local policies may be configured to identify situations where a privacy breach may occur and address them by adjusting settings that affect the data exchanged between the client device 302 and the network server 310. Global policies may be configured to identify situations where a privacy breach may occur and address them by adjusting settings that affect the data exchanged between the network server 310 and other devices. In this case the client device 302 and the network server 310 may use the global and local policy configurations to implement this approach. In some implementations, when two local policies are in conflict, then the global policy may override the local policy. When the global policy is not in conflict with the local policies, then the local policy may provide more granular rules that meet the user preferences for privacy on case by case basis.

In some instances, a local policy of a user may have a higher priority than the global policy or another local policy of another user. In some cases, the local policy may be implemented over lower ranking policies. In other cases, network latency may affect which policy is implemented. The higher priority policy may require more network and/or computing resources to implement. If there are sufficient network and/or computing resources, then the higher priority policy may be implemented. If there are insufficient network and/or computing resources for the higher priority policy, then the lower priority policy may be implemented.

Figure 4:
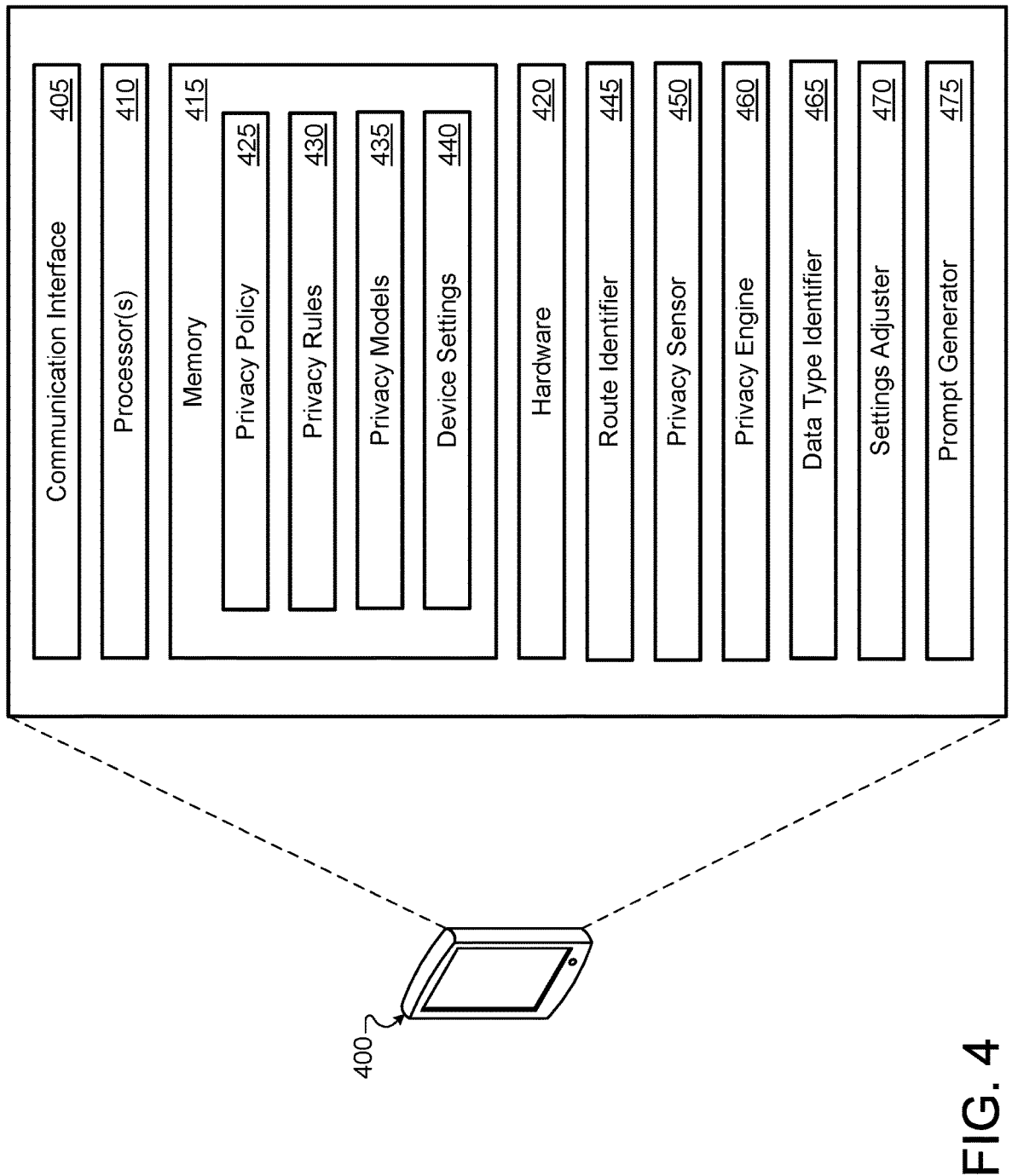
FIG. 4 illustrates an example device for ensuring the privacy of a user.

FIG. 4 illustrates an example device 400 for ensuring the privacy of a user. The device 400 may be any type of computing device that is configured to communicate with a wireless carrier network. For example, the device 400 may be similar to the client device 102 of FIG. 1 and/or the client device 302 of FIG. 3. Some of the components of the device 400 may be implemented in a single computing device or distributed over multiple computing devices. Some of the components may be in the form of virtual machines or software containers that are hosted in a cloud in communication with disaggregated storage devices.

The device 400 may include a communication interface 405, one or more processors 410, memory 415, and hardware 420. The communication interface 205 may include communication components that enable the device 400 to transmit data to and receive data from devices connected to the wireless carrier network. The communication interface 205 may include a cellular interface that is configured to communicate with base stations of a wireless carrier network. The communication interface 205 may receive data that other devices transmit to the base stations and/or transmit data to the base stations for transmission to the other devices.

The hardware 420 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 415 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multi-media/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 410 may implement a privacy sensor 450 and a data type identifier 465. The privacy sensor 450 may be similar to the privacy sensor 114 of FIG. 1 and/or the privacy sensor 314 of FIG. 3. The data type identifier 465 may be similar to the data type identifier 116 of FIG. 1 and/or the data type identifier 316 of FIG. 3. The privacy sensor 250 may be configured to determine when a privacy breach may be possible, and the data type identifier 265 may be configured to determine a type of data that a device 400 is prepared to transmit. The privacy sensor 250 may receive initialization data for an application that the user is interacting with to initiate a communication with another user. The initialization data may indicate that the device 400 is prepared to transmit data to another device. The initialization data may identify the data that the device 400 is prepared to transmit and characteristics of that data.

The privacy sensor 450 may provide the initialization data to the data type identifier 465 and/or the data type identifier 465 may receive the initialization data from the application with which the user is interacting. The data type identifier 465 may determine a type of the data that the device 400 is prepared to transmit. The data type identifier 465 may be configured to classify the data and assign a data type to the data from a group of predetermined data types. For example, the data types may include video data, audio data, text data, image data, streaming data, and/or any similar type of data. In some implementations, the data type identifier 465 may determine that the device 400 is prepared to transmit more than one type of data as may be the case with a text message with a photo attached.

The privacy sensor 450 may use the privacy rules 430 and/or the privacy models 435 to determine whether a privacy breach is likely to occur when the device 400 transmits the data. The privacy rules 430 may compare the initialization data, route data, and the type of data to one or more rules that determine whether a privacy breach is likely to occur. The route identifier 445 may determine a likely route of the data from the device 400 to the recipient device. The route identifier 445 may, in some instances, receive route data from a network server. The rules may generate a privacy breach score that indicates a likelihood of a privacy breach. A higher privacy breach score may indicate a higher likelihood of a privacy breach. For example, a rule may indicate that outputting an audio stream with a sampling rate of a voice of a user of 88.2 kilohertz has a privacy breach score of 0.5. That same rule may indicate that outputting an audio stream of voice of a user with a sampling rate of 44.1 kilohertz has a privacy breach score of 0.1. Another rule may generate a privacy breach score based on the resolution of a video stream that depicts a user.

The privacy sensor 450 may compare the privacy breach score to a threshold. If the privacy breach score satisfies the threshold, then the privacy sensor 450 may determine that a privacy breach may be possible. For example, if the privacy breach score is 0.5 and the threshold is 0.3, then the privacy sensor 450 may determine that a privacy breach may be possible. If the privacy breach score does not satisfy the threshold, then the privacy sensor 450 may determine that a privacy breach may not be possible or that a privacy breach is unlikely enough not to adjust any settings on the device 400. For example, if the privacy breach score is 0.1 and the threshold is 0.3, then the privacy sensor 450 may determine that a privacy breach may not be possible. In some implementations, the user may be able to adjust the threshold depending on the user's tolerance for privacy risks.

In some implementations, the privacy sensor 450 may use one or more privacy models 435 that are each configured to receive data indicating the settings of the device 400, route data, data identifying the type of data that the device 400 is prepared to transmit, and/or any additional data. The privacy models 435 may be configured to output a privacy breach score and/or an indication whether a privacy breach is likely. The device 400 may receive the models from a server of the wireless carrier network. The server may include a model trainer that is configured to train the models using machine learning and historical data. The historical data may include the settings of devices similar to the device 400, the type of data transmitted by the similar devices, route data, whether a privacy breach occurred, and/or any other type of data.

The one or more processors 410 may implement a privacy engine 460. The privacy engine 460 may be similar to the privacy engine 118 of FIG. 1 and/or the privacy engine 318 of FIG. 3. The privacy engine 460 may be configured to identify actions that may mitigate the possibility of a privacy breach. The actions may include encrypting a data stream, adjusting the resolution of video data, adjusting the sample rate and/or bitrate of audio data, alerting the user, and/or any other similar actions. The privacy engine 460 may use a combination of privacy policies 425, privacy rules 430, and/or privacy models 435 to determine whether to perform an action and/or instruct the device 400 to perform an action.

In some implementations, the privacy engine 460 may implement a service for which a user signs up. In some instances, the user may pay a subscription fee to benefit from the services of the privacy engine 460. The privacy engine 460 communicate with a server to verify that the user is authorized to benefit from the services of the privacy engine 460. In some implementations, the privacy engine 460 may alert the user to a potential privacy breach, but may not automatically suggest an action and/or automatically perform the action if the user is not authorized to benefit from the services of the privacy engine 460.

The privacy policies 425 may include preferences and/or settings of various users and/or policies of the wireless carrier network. A setting of a user may indicate that the user prefers to encrypt communications when there is a risk of a privacy breach. Another setting of the user may indicate that the lowest sampling rate that the user wishes to use to sample audio data before transmitting the audio data is 44.1 kilohertz. A policy of a wireless carrier network may indicate that communications should be encrypted when there is a risk of a privacy breach and the data is routed through a third-party.

The privacy rules 430 may indicate various actions that the privacy engine 460 should take based on the settings of the device 400, the data route, the type of data that the device 400 is prepared to transmit, the likelihood of a privacy breach, and/or any other similar factors. An example privacy rule 430 may indicate that the resolution of video data should be reduced if the resolution is 4K or higher and if there is a possibility of a privacy breach. Another privacy rule 430 may indicate that audio data should be down sampled if the sampling rate is 88.2 kilohertz or higher and if there is a possibility of a privacy breach.

The privacy models 435 may be configured to receive initialization data, data identifying a type of data that the device 400 is prepared to transmit, route data, and/or any other similar inputs. The privacy models 435 may output data indicating an adjustment to the device 400. By implementing the adjustment to the device 400, the likelihood of a privacy breach is reduced.

The privacy models 435 may include various models trained using the historical data and machine learning. The historical data may include the settings of devices similar to the device 400, the type of data transmitted by the similar devices, whether a privacy breach occurred, the settings of a recipient device, a route of the data from the similar devices to the recipient device, and/or any other type of data. The model trainer may be configured to train the privacy models 435 so they are configured to output data different than models used by the privacy sensor 450. While the models used by the privacy sensor 450 may output data indicating the likelihood of a privacy breach, the privacy models used by the privacy engine 460 may output data indicating an adjustment to the device settings that decreases the likelihood of a privacy breach.

The privacy engine 460 may be configured to select the appropriate model based on initialization data, data identifying a type of data that the device 400 is prepared to transmit, route data, and/or any other similar inputs. The privacy engine 460 may select the model that is configured to receive the initialization data, data identifying a type of data that the device 400 is prepared to transmit, route data, and/or any other similar inputs. For example, if the privacy engine 460 receives device setting data, route data, and data identifying the type of data, then the privacy engine 460 selects a privacy model 435 that is configured to receive those inputs.

In some instances, the privacy rules 430 and/or the privacy models 435 may indicate that adjusting the device settings may not decrease the likelihood of a privacy breach. This may occur if the privacy models output an adjustment that indicates the same settings that already exist in the device settings. For example, if the device settings of the device 400 indicate that the sampling rate of the audio data is twenty-two kilohertz and the privacy models 235 and privacy rules 430 indicate to down sample the audio data to twenty-two kilohertz, then the privacy engine 460 may take no additional action.

In some instances, the outputs of the privacy models 435 and the privacy rules 430 may conflict. A conflict may exist when the two actions identified by the privacy models 435 and the privacy rules 430 may not be able to be implemented at the same time. For example, if the privacy models 435 indicate to down sample the audio data to twenty-two kilohertz, and the privacy rules 430 indicate to down sample the audio data to 44.2 kilohertz, then the privacy engine 460 may select between the two actions. The privacy engine 260 may combine the two sampling rates by averaging the two sampling rates and round the result. If the privacy engine 460 is unable to implement or combine both actions, then the privacy engine 460 may select one of the actions automatically or request that the user select an action. In some instances, the actions may be able to both be implemented. For example, the privacy models 435 indicate to down sample the audio data to 44.2 kilohertz, and the privacy rules 430 indicate to encrypt the audio data. In this case, the privacy engine 460 may attempt to perform both actions.

The one or more processors 410 may implement a settings adjuster 470. The settings adjuster 470 may be similar to the settings adjuster 132 of FIG. 1 and/or the settings adjuster 332 of FIG. 3. The settings adjuster 470 may be configured to automatically implement the action identified by the privacy engine 460. The settings adjuster 470 may automatically update the device settings 440 based on the action. In some implementations, the settings adjuster 470 may be configured to use the prompt generator 475 to determine whether the user of the device 400 accepts the actions. The prompt generator 475 may generate a GUI and transmit the GUI to the device 400. The GUI may request that the user grant permission to perform the action or actions that mitigate the privacy risk. If the user grants permission, then the settings adjuster 270 updates the device settings 440 based on the action.

In some implementations, the device 400 may receive data indicating whether a privacy breach occurred during transmission of the data. The data indicating whether a privacy breach occurred may be based on the data being intercepted or not intercepted by a third party and/or data received from the user. The device 400 may provide updated data to the server. The server may update the historical data with the settings of the device 400 before and after the settings change, the type of data transmitted by the device 400, the route data, the initialization data, and/or any other similar data. The model trainer of the server may update the models using the updated historical data and using machine learning. The server may provide the updated models to the device 400, and the device 400 may store the updated models in the privacy models 435. In some instances, the device 400 may be unable to determine whether a privacy breach occurred. In this case, the device 400 may not provide updated data to the server.

Figure 5:
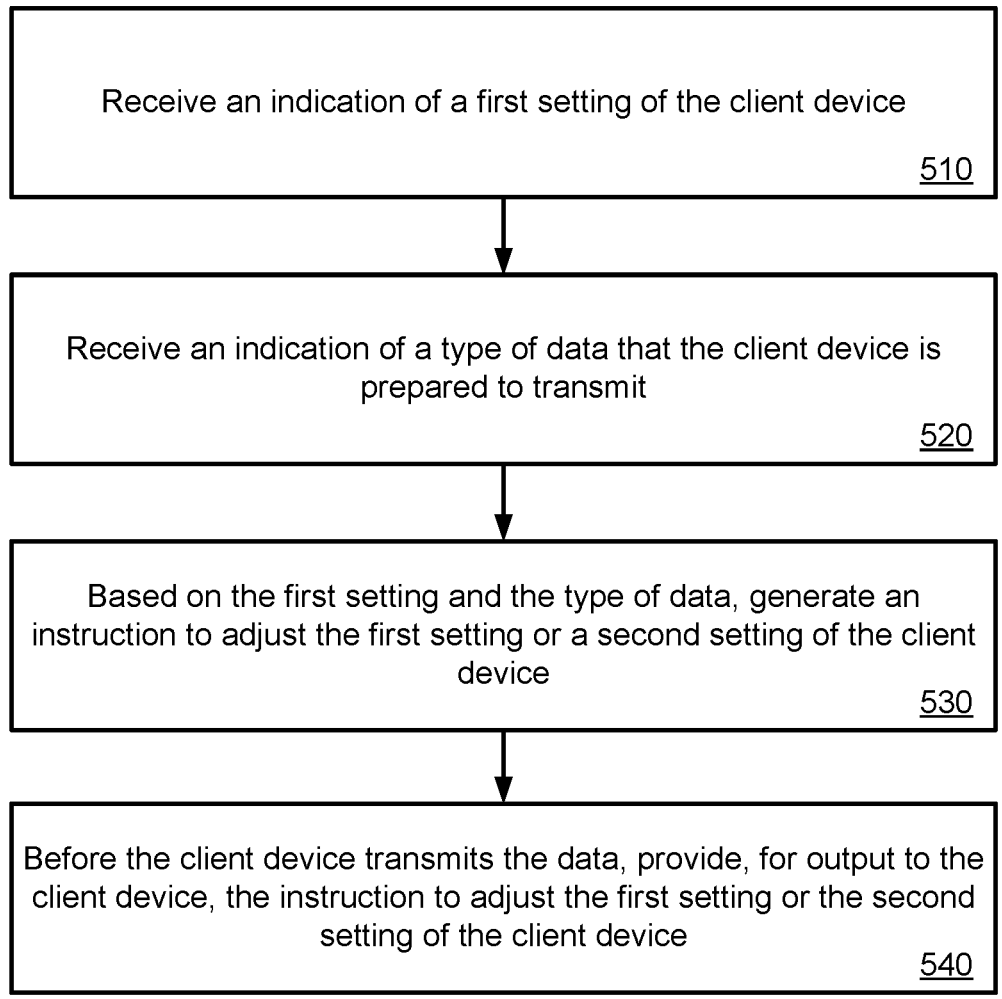
FIGS. 5 and 6 are flowcharts of example processes for ensuring the privacy of a user.

FIG. 5 is a flowchart of example process 500 for ensuring the privacy of a user. In general, the process 500 determines the type of data that a client device is prepared to transmit and the settings of the client device. The process 500 determines whether the settings of the client device can be adjusted that can reduce the likelihood of a privacy breach. The process 500 will be described as being performed by the network server 110 and will include references to other components in FIG. 1. The process 500 may also be performed by the server 200 of FIG. 2, the client device 302 of FIG. 3, and/or the device 400 of FIG. 4.

The network server 110 receives, from a client device 102, an indication of a first setting of the client device 102 (510). The first setting of the client device 102 may be the resolution of a camera of the client device 102, the sampling rate of an audio subsystem that includes a microphone of the client device 102, the bitrate of the audio subsystem, an encryption setting of the client device 102, and/or any other similar setting. The client device 102 may provide the indication of the first setting in response to the user 104 interacting with the client device 102. The interaction may include the user 104 interacting with an application on the client device 102 such as a phone call application, a video call application, and/or any other similar application where the user transmits information. The interaction may include selecting a communication channel such as audio, video, text, and/or any other similar channel and/or may include selecting a recipient from a contacts list.

The network server 110 receives, from the client device 102, an indication of a type of data that the client device 102 is prepared to transmit (520). In addition to providing data indicating the first setting, the client device 102 provides the indication of the type of data in response to the user 104 interacting with the client device 102. The interaction may include interacting with an application on the client device 102. The interaction may also include selecting a communication channel such as audio, video, text, and/or any other similar channel and/or may include selecting a recipient from a contacts list.

In some implementations, the network server 110 may include a data type identifier 116 that is configured to determine the type of data that the client device 102 is prepared to transmit. The data type identifier 116 may select from predetermined data types that may include audio, video, text, and/or any other similar type of data. The data type identifier 116 may select more than one data type in instances where the client device 102 is prepared to transmit more than one type of data.

Based on the first setting and the type of data, the network server 110 generates an instruction to adjust the first setting or a second setting of the client device 102 (530). In some implementations, the network server 110 determines a likelihood of a security breach based on the first setting and the type of data. The network server 110 may use a combination of models and/or rules to determine the likelihood of a security breach. The models and rules may be configured to receive the first setting and the type of data and output the adjustment to the first setting or a second setting. The network server 110 may use historical training data and machine learning to train the models. In some implementations, the network server 110 may continuously collect additional training data as the network server 110 initiates actions to reduce the risk of privacy breaches.

In some implementations, the network server 110 may generate a GUI prompt indicating the adjustment. The network server 110 may provide the GUI prompt to the client device 102. If the user accepts the adjustment, then the network server 110 may proceed with adjusting the setting. If the user rejects the adjustment, then the network server 110 may not make the adjustment.

In some implementations, the user may preauthorize the network server 110 to automatically adjust certain settings to decrease the likelihood of a privacy breach. In this case, the network server 110 may automatically generate the instruction to adjust the setting and provide the instruction to the client device 102 without requesting authorization from the user 104.

In some implementations, the network server 110 may generate an instruction to adjust a setting of the client device 102 if adjusting that setting reduces the risk of a security breach. In this instance, the network server 110 may not determine whether the likelihood of a security breach satisfies a threshold likelihood. Instead, the network server 110 may determine what settings are adjustable and whether adjusting any of those settings may reduce the risk of a security breach. In this case, the network server 110 may not select adjustments that degrade the quality of the user's experience and/or violate any of the privacy policies of the user or the wireless network carrier.

In some implementations, the network server 110 receives, from the client device, data identifying a recipient of the communication. In this case, the network server 110 may use the identity of the recipient and/or characteristics of the computing device 106 of the recipient to determine an action to mitigate the likelihood of a privacy breach. In some implementations, the likely route that the data will take from the client device 102 to the computing device 106 may also be a factor in determining the action to mitigate the likelihood of a privacy breach. In these cases, the identity of the recipient, the characteristics of the computing device 106 of the recipient, and/or the route of the data may be inputs to the rules and/or models.

In some examples and before the client device 102 transmits the data, the network server 110 provides, for output to the client device 102, the instruction to adjust the first setting or the second setting of the client device 102 (540). The client device 102 may receive the instruction and implement the adjustment. As an example, the first setting may be the resolution of a camera of the client device and the type of data may be video data. This may be the case if the user 104 is attempting to initiate a video call with another user 108. Based on the video resolution and the video data, the network server 110 may determine that encrypting the video data will reduce the likelihood of a privacy breach.

In some implementations, the user 104 may readjust the settings after the network server 110 has provided the instruction to the client device 102 and after the client device 102 has adjusted the setting. In this case, the client device 102 may provide an indication to the network server 110 indicating the readjustment. The network server 110 may update the privacy policy and/or the models. By updating the privacy policy and/or the models, the network server 110 will likely not adjust that setting in the future.

As another example, the user 104 may attempt to transmit a video file that is stored on the client device 102 to a recipient. The video file may have a resolution of 4K. In response to the user's interaction with the application that sends the video file, the client device 102 may provide the network server 110 data indicating the imminent sending of a 4K video file. The network server 110 may determine that client device 102 is prepared to send a video file with 4K resolution. Based on those characteristics, the network server 110 may provide the characteristics as an input to the rules and/or models. The models and/or the rules may indicate to reduce the resolution of the video before sending the video to the recipient. The network server 110 may provide the instruction to the client device 102 to reduce the resolution of the video file before sending to the recipient.

Figure 6:
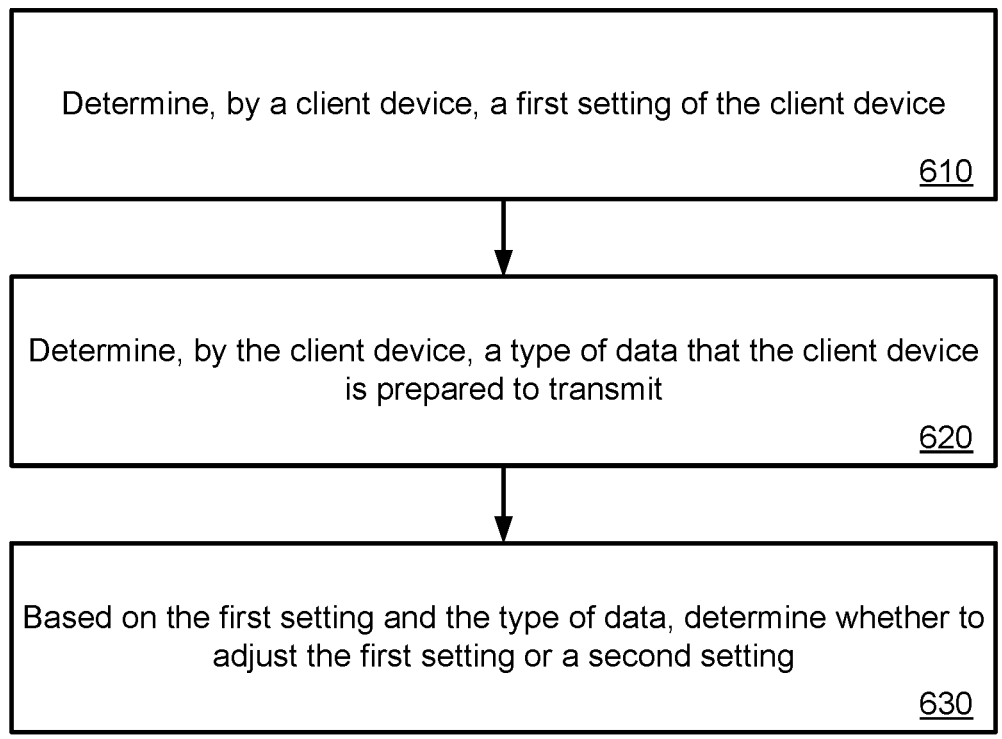

FIG. 6 is a flowchart of example process 600 for ensuring the privacy of a user. In general, the process 600 determines the type of data that a client device is prepared to transmit and the settings of the client device. The process 600 determines whether the settings of the client device can be adjusted that can reduce the likelihood of a privacy breach. The process 500 will be described as being performed by the client device 302 and will include references to other components in FIG. 3. The process 600 may also be performed by the network server 110 of FIG. 1, the server 200 of FIG. 2, and/or the device 400 of FIG. 4.

The client device 302 determines a first setting of the client device 302 (610). The first setting of the client device 302 may be the resolution of a camera of the client device 302, the sampling rate of an audio subsystem that includes a microphone of the client device 302, the bitrate of the audio subsystem, an encryption setting of the client device 302, and/or any other similar setting. The client device 302 may determine the first setting in response to the user 304 interacting with the client device 302. The interaction may include the user 304 interacting with an application on the client device 302 such as a phone call application, a video call application, and/or any other similar application where the user transmits information. The interaction may include selecting a communication channel such as audio, video, text, and/or any other similar channel and/or may include selecting a recipient from a contacts list.

The client device determines a type of data that the client device 302 is prepared to transmit (620). In addition to determining the first setting, the client device 302 determines the type of data in response to the user 304 interacting with the client device 302. The interaction may include interacting with an application on the client device 302. The interaction may also include selecting a communication channel such as audio, video, text, and/or any other similar channel and/or may include selecting a recipient from a contacts list.

In some implementations, client device 302 may include a data type identifier 316 that is configured to determine the type of data that the client device 302 is prepared to transmit. The data type identifier 316 may select from predetermined data types that may include audio, video, text, and/or any other similar type of data. The data type identifier 316 may select more than one data type in instances where the client device 302 is prepared to transmit more than one type of data.

Based on the first setting and the type of data, the client device 302 determines whether to adjust the first setting or a second setting (630). In some implementations, the client device 302 may adjust the first or second setting if the adjustment decreases the likelihood of a privacy breach. In some implementations, the client device 302 may adjust the first or second setting if the likelihood of a privacy breach before the adjustment satisfies a threshold.

In some implementations, the client device 302 determines a likelihood of a security breach based on the first setting and the type of data. The client device 302 may use a combination of models and/or rules to determine the likelihood of a security breach. The models and rules may be configured to receive the first setting and the type of data and output the adjustment to the first setting or a second setting.

The client device 302 receive the models from a model trainer 326 included in the network server 310. The model trainer 326 may use historical training data and machine learning to train the models. In some implementations, the network server 310 may continuously collect additional training data and provide updated models to the client device 302.

In some implementations, the client device 302 may generate a GUI prompt indicating the adjustment. The client device 302 may output the GUI prompt to the display of the client device 302. If the user accepts the adjustment, then the client device 302 may proceed with adjusting the setting. If the user rejects the adjustment, then the client device 302 may not make the adjustment.

In some implementations, the user may preauthorize the client device 302 to automatically adjust certain settings to decrease the likelihood of a privacy breach. In this case, the client device 302 may automatically adjust the setting without requesting authorization from the user 304.

In some implementations, the client device 302 may adjust a setting of the client device 302 if adjusting that setting reduces the risk of a privacy breach. In this instance, the client device 302 may not determine whether the likelihood of a security breach satisfies a threshold likelihood. Instead, the client device 302 may determine what settings are adjustable and whether adjusting any of those settings may reduce the risk of a security breach. In this case, the client device 302 may not select adjustments that degrade the quality of the user's experience and/or violate any of the privacy policies of the user or the wireless network carrier.

In some implementations, the client device 302 identifies a recipient of the communication. In this case, the client device 302 may use the identity of the recipient and/or characteristics of the computing device 306 of the recipient to determine an action to mitigate the likelihood of a privacy breach. In some implementations, the likely route that the data will take from the client device 302 to the computing device 306 may also be a factor in determining the action to mitigate the likelihood of a privacy breach. In these cases, the identity of the recipient, the characteristics of the computing device 306 of the recipient, and/or the route of the data may be inputs to the rules and/or models.

In some implementations, the user 304 may readjust the settings after the client device 302 has adjusted the setting. In this case, the client device 302 may update the privacy policy and/or the models by providing data indicating the readjustment to the model trainer 326 of the network server 310. By updating the privacy policy and/or the models, the client device 302 will likely not adjust that setting in the future.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
receiving, from a first client device that is preparing to transmit media content to a second client device and that is communicating with a wireless carrier network, an indication of a first setting of the first client device;

receiving, from the first client device, an indication of a type of the media content that the first client device is preparing to transmit to the second client device via the wireless carrier network;

receiving data indicating that a network route that the media content will travel includes the wireless carrier network and a server that is operated by a party other than the wireless carrier network;

based on the first setting, the data indicating that the network route that the media content will travel includes the wireless carrier network and the server that is operated by the party other than the wireless carrier network, and the type of the media content that the first client device is preparing to transmit to the second client device, generating an instruction to adjust the first setting or a second setting of the first client device; and before the first client device transmits the media content to the second client device, providing, for output to the first client device, the instruction to adjust the first setting or the second setting of the first client device before transmitting the media content to the second client device.

2. The method of claim 1, comprising:

providing the indication of the first setting of the first client device, the data indicating that the network route that the media content will travel includes the wireless carrier network and the server that is operated by the party other than the wireless carrier network, and the indication of the type of the media content that the first client device is preparing to transmit to the second client device to a model that is configured to determine whether to adjust the first setting or the second setting; and receiving, from the model, an output indicating to adjust the first setting or the second setting of the first client device, wherein generating the instruction to adjust the first setting or the second setting of the first client device is further based on the output from the model indicating to adjust the first setting or the second setting of the first client device.

3. The method of claim 1, comprising:

based on the first setting or the second setting, the data indicating that the network route that the media content will travel includes the wireless carrier network and the server that is operated by the party other than the wireless carrier network, and the type of the media content that the first client device is preparing to transmit to the second client device, generating a prompt for a user regarding adjusting the first setting or the second setting;

providing, for output to the first client device, the prompt regarding adjusting the first setting or the second setting; and receiving, from the first client device, an approval to adjust the first setting or the second setting, wherein generating the instruction to adjust the first setting or the second setting of the first client device is further based on receiving the approval to adjust the first setting or the second setting.

4. The method of claim 1, comprising:

before receiving the indication of the type of the media content that the first client device is preparing to transmit to the second client device, receiving, from the first client device, an authorization to adjust the first setting and the second setting of the first client device, wherein generating the instruction to adjust the first setting or the second setting of the first client device is further based on receiving authorization to adjust the first setting and the second setting of the first client device.

5. The method of claim 1, comprising:

after providing the instruction to adjust the first setting or the second setting of the first client device:
  receiving, from the first client device, data indicating that the first client device adjusted the first setting or the second setting of the first client device; and
  receiving, from the client device, data indicating that a user manually adjusted the adjusted the first setting or the second setting of the first client device; and based on the data indicating that the first client device adjusted the first setting or the second setting of the first client device and based on the data indicating that a user manually adjusted the adjusted the first setting or the second setting of the first client device, updating a model used to determine to generate the instruction to adjust the first setting or the second setting of the first client device.

6. The method of claim 1, comprising:

receiving, from the first client device, data identifying the second client device, wherein generating the instruction to adjust the first setting or the second setting of the first client device is based on the second client device.

7. The method of claim 1, wherein:

the first setting is a setting of a resolution of a camera of the first client device, the type of media content is video data, and the second setting is an encryption setting.

8. The method of claim 1, comprising:

receiving training data that includes data samples that each include a previous indication of the first setting, a previous indication of the second setting, a previous indication of a type of previous media content, data indicating a previous network route that the previous media content traveled, data indicating whether the previous network route included a server operated by a previous party other than the wireless carrier network, and data indicating whether a privacy breach occurred with respect to the previous media content;

training, using machine learning, a model that is configured to receive a given indication of the first setting and a given indication of a type of given media content and output data indicating whether to adjust the first setting or the second setting, wherein generating the instruction to adjust the first setting or the second setting of the first client device is based on the model.

9. A system, comprising:

one or more processors; and memory including a plurality of computer-executable components that are executable by the one or more processors to perform a plurality of actions, the plurality of actions comprising:
  receiving, from a first client device that is preparing to transmit media content to a second client device and that is communicating with a wireless carrier network, an indication of a first setting of the first client device;
  receiving, from the first client device, an indication of a type of the media content that the first client device is preparing to transmit to the second client device via the wireless carrier network;

receiving data indicating that a network route that the media content will travel includes the wireless carrier network and a server that is operated by a party other than the wireless carrier network;

based on the first setting, the data indicating that the network route that the media content will travel includes the wireless carrier network and the server that is operated by the party other than the wireless carrier network, and the type of the media content that the first client device is preparing to transmit to the second client device, generating an instruction to adjust the first setting or a second setting of the first client device; and before the first client device transmits the media content to the second client device, providing, for output to the first client device, the instruction to adjust the first setting or the second setting of the first client device before transmitting the media content to the second client device.

10. The system of claim 9, wherein the actions comprise:
providing the indication of the first setting of the first client device, the data indicating that the network route that the media content will travel includes the wireless carrier network and the server that is operated by the party other than the wireless carrier network, and the indication of the type of the media content that the first client device is preparing to transmit to the second client device to a model that is configured to determine whether to adjust the first setting or the second setting; and receiving, from the model, an output indicating to adjust the first setting or the second setting of the first client device, wherein generating the instruction to adjust the first setting or the second setting of the first client device is further based on the output from the model indicating to adjust the first setting or the second setting of the first client device.

11. The system of claim 9, wherein the actions comprise:
based on the first setting or the second setting, the data indicating that the network route that the media content will travel includes the wireless carrier network and the server that is operated by the party other than the wireless carrier network, and the type of the media content that the first client device is preparing to transmit to the second client device, generating a prompt for a user regarding adjusting the first setting or the second setting;

providing, for output to the first client device, the prompt regarding adjusting the first setting or the second setting; and receiving, from the first client device, an approval to adjust the first setting or the second setting, wherein generating the instruction to adjust the first setting or the second setting of the first client device is further based on receiving the approval to adjust the first setting or the second setting.

12. The system of claim 9, wherein the actions comprise:
before receiving the indication of the type of the media content that the first client device is preparing to transmit to the second client device, receiving, from the first client device, an authorization to adjust the first setting and the second setting of the first client device, wherein generating the instruction to adjust the first setting or the second setting of the first client device is further based on receiving authorization to adjust the first setting and the second setting of the first client device.

13. The system of claim 9, wherein the actions comprise:
after providing the instruction to adjust the first setting or the second setting of the first client device:
receiving, from the first client device, data indicating that the first client device adjusted the first setting or the second setting of the first client device; and receiving, from the client device, data indicating that a user manually adjusted the adjusted the first setting or the second setting of the first client device; and based on the data indicating that the first client device adjusted the first setting or the second setting of the first client device and based on the data indicating that a user manually adjusted the adjusted the first setting or the second setting of the first client device, updating a model used to determine to generate the instruction to adjust the first setting or the second setting of the first client device.

14. The system of claim 9, wherein the actions comprise:
receiving, from the first client device, data identifying the second client device, wherein generating the instruction to adjust the first setting or the second setting of the first client device is based on the second client device.

15. The system of claim 9, wherein:
the first setting is a setting of a resolution of a camera of the first client device,
the type of media content is video data, and
the second setting is an encryption setting.

16. The system of claim 9, wherein the actions comprise:
receiving training data that includes data samples that each include a previous indication of the first setting, a previous indication of the second setting, a previous indication of a type of previous media content, data indicating a previous network route that the previous media content traveled, data indicating whether the previous network route included a server operated by a previous party other than the wireless carrier network, and data indicating whether a privacy breach occurred with respect to the previous media content;

training, using machine learning, a model that is configured to receive a given indication of the first setting and a given indication of a type of given media content and output data indicating whether to adjust the first setting or the second setting, wherein generating the instruction to adjust the first setting or the second setting of the first client device is based on the model.

17. One or more non-transitory computer-readable media of a computing device storing computer-executable instructions that upon execution cause one or more processors to perform acts comprising:

receiving, from a first client device that is preparing to transmit media content to a second client device and that is communicating with a wireless carrier network, an indication of a first setting of the first client device;

receiving, from the first client device, an indication of a type of the media content that the first client device is preparing to transmit to the second client device via the wireless carrier network;

receiving data indicating that a network route that the media content will travel includes the wireless carrier network and a server that is operated by a party other than the wireless carrier network;

based on the first setting, the data indicating that the network route that the media content will travel includes the wireless carrier network and the server that is operated by the party other than the wireless carrier network, and the type of the media content that the first client device is preparing to transmit to the second client device, generating an instruction to adjust the first setting or a second setting of the first client device; and before the first client device transmits the media content to the second client device, providing, for output to the first client device, the instruction to adjust the first setting or the second setting of the first client device before transmitting the media content to the second client device.

18. The media of claim 17, wherein the acts comprise:

providing the indication of the first setting of the first client device, the data indicating that the network route that the media content will travel includes the wireless carrier network and the server that is operated by the party other than the wireless carrier network, and the indication of the type of the media content that the first client device is preparing to transmit to the second client device to a model that is configured to determine whether to adjust the first setting or the second setting; and receiving, from the model, an output indicating to adjust the first setting or the second setting of the first client device, wherein generating the instruction to adjust the first setting or the second setting of the first client device is further based on the output from the model indicating to adjust the first setting or the second setting of the first client device.

\* \* \* \* \*